United States Patent
Matthews et al.

(10) Patent No.: US 9,197,710 B1
(45) Date of Patent: Nov. 24, 2015

(54) TEMPORAL BASED DATA STRING INTERN POOLS

(75) Inventors: Jacob Burton Matthews, Chicago, IL (US); Mayur Venktesh Deshpande, Long Beach, CA (US); Kasem Marifet, Costa Mesa, CA (US); James Lee Wogulis, Laguna Beach, CA (US)

(73) Assignee: Google Inc., Mountain View, CA (US)

( * ) Notice: Subject to any disclaimer, the term of this patent is extended or adjusted under 35 U.S.C. 154(b) by 1092 days.

(21) Appl. No.: 13/239,285

(22) Filed: Sep. 21, 2011

Related U.S. Application Data

(60) Provisional application No. 61/510,052, filed on Jul. 20, 2011.

(51) Int. Cl.
*G06F 12/00* (2006.01)
*H04L 29/08* (2006.01)

(52) U.S. Cl.
CPC .............. *H04L 67/22* (2013.01); *H04L 67/36* (2013.01)

(58) Field of Classification Search
CPC ........ H04L 67/22; H04L 67/36; H04L 43/022
See application file for complete search history.

(56) References Cited

U.S. PATENT DOCUMENTS

| | | | |
|---|---|---|---|
| 5,301,290 A | 4/1994 | Tetzlaff et al. | |
| 5,414,839 A | 5/1995 | Joshi | |
| 5,550,981 A | 8/1996 | Bauer et al. | |
| 5,890,159 A | 3/1999 | Sealby et al. | |
| 6,108,654 A | 8/2000 | Chan et al. | |
| 6,144,983 A | 11/2000 | Klots et al. | |
| 6,362,836 B1 | 3/2002 | Shaw et al. | |
| 6,460,067 B1 | 10/2002 | Chaudhry et al. | |
| 6,606,626 B1 | 8/2003 | Ponnekanti | |
| 6,950,848 B1 | 9/2005 | Yousefi'zadeh | |
| 7,085,682 B1 | 8/2006 | Heller et al. | |
| 7,363,387 B1 | 4/2008 | Chandra et al. | |
| 7,636,677 B1 | 12/2009 | McGonigal et al. | |
| 7,768,919 B1 | 8/2010 | Conway | |
| 7,792,954 B2 | 9/2010 | Hanson et al. | |
| 8,060,880 B2 | 11/2011 | Cherem et al. | |
| 8,307,101 B1 | 11/2012 | Mui et al. | |
| 8,321,443 B2 | 11/2012 | Andrade et al. | |

(Continued)

OTHER PUBLICATIONS

"The Web Doesn't Wait—Neither Should You," Chartbeat—Real-Time Website Analytics and Uptime Monitoring, Jul. 19, 2011, http://chartbeat.com.

(Continued)

*Primary Examiner* — Edward Dudek, Jr.
(74) *Attorney, Agent, or Firm* — Foley & Lardner LLP; John D. Lanza

(57) ABSTRACT

Configurations for providing temporal based data string intern pools that reuse data strings and decrease unnecessary operations to memory. A data structure representing a string intern pool is allocated for a first time period and one or more strings associated with event data communications are stored in the data structure. To optimize memory usage, if a string associated with an event tracking data communication is located within the data structure, a pointer is then assigned to the string instead of storing the string in the data structure. In a second time period, a second data structure is allocated for another string intern pool and matching strings from event tracking data communications are assigned to pointers for existing strings in the second data structure. The first data structure is maintained during the second time period but no additional strings are written to the first data structure.

20 Claims, 13 Drawing Sheets

(56) References Cited

U.S. PATENT DOCUMENTS

| | | | |
|---|---|---|---|
| 8,761,181 B1* | 6/2014 | Gostev | 370/393 |
| 2002/0042821 A1 | 4/2002 | Muret et al. | |
| 2003/0028631 A1 | 2/2003 | Rhodes | |
| 2003/0105756 A1 | 6/2003 | Daynes | |
| 2003/0107994 A1 | 6/2003 | Jacobs et al. | |
| 2003/0135525 A1* | 7/2003 | Huntington et al. | 707/501.1 |
| 2004/0008896 A1 | 1/2004 | Suzuki | |
| 2004/0122943 A1 | 6/2004 | Error et al. | |
| 2004/0148375 A1 | 7/2004 | Levett et al. | |
| 2005/0198273 A1 | 9/2005 | Childress et al. | |
| 2006/0168099 A1 | 7/2006 | Diamant | |
| 2006/0274761 A1 | 12/2006 | Error et al. | |
| 2007/0033372 A1 | 2/2007 | Everhart et al. | |
| 2007/0157157 A1 | 7/2007 | Dentzer et al. | |
| 2008/0040473 A1 | 2/2008 | Larsson et al. | |
| 2008/0114875 A1 | 5/2008 | Anastas et al. | |
| 2008/0235163 A1* | 9/2008 | Balasubramanian et al. | 706/12 |
| 2009/0161594 A1 | 6/2009 | Zhu et al. | |
| 2009/0245104 A1 | 10/2009 | Nishimura et al. | |
| 2010/0075707 A1 | 3/2010 | Fritsch et al. | |
| 2010/0138531 A1 | 6/2010 | Kashyap | |
| 2010/0146110 A1 | 6/2010 | Christensen et al. | |
| 2010/0169894 A1 | 7/2010 | Sheaffer et al. | |
| 2010/0223244 A1 | 9/2010 | Sinha et al. | |
| 2010/0250670 A1 | 9/2010 | Wei | |
| 2010/0312884 A1* | 12/2010 | Nandy et al. | 709/224 |
| 2010/0318527 A1 | 12/2010 | Nandy et al. | |
| 2010/0322187 A1 | 12/2010 | Tani et al. | |
| 2010/0332531 A1 | 12/2010 | Galande | |
| 2011/0029581 A1 | 2/2011 | Zhao et al. | |
| 2011/0107241 A1 | 5/2011 | Moore | |
| 2011/0131316 A1 | 6/2011 | Ferris et al. | |
| 2011/0161392 A1 | 6/2011 | Langley et al. | |
| 2011/0283045 A1 | 11/2011 | Krishnan et al. | |
| 2012/0017156 A1 | 1/2012 | Broda et al. | |
| 2012/0017204 A1* | 1/2012 | Hrischuk et al. | 717/151 |
| 2012/0311153 A1 | 12/2012 | Morgan | |
| 2012/0324093 A1 | 12/2012 | He | |
| 2012/0331229 A1 | 12/2012 | Sabir | |

OTHER PUBLICATIONS

"SiteCatalyst Product Overview", Adobe SiteCatalyst, Jul. 19, 2011, http://www.omniture.com/en/products/online_analystics/sitecatalyst.

"Your Dots, Connect," Webtrends, Analytics, Jul. 19, 2011, http://www.webtrends.com/Products/Analytics.

"Real Time Web Analytics," Web Analytics in Real Time/Clicky, Jul. 19, 2011, http://getclicky.com.

"Features Overview," Woopra, Jul. 19, 2011, http://www.woopra.com/features.

Himel, "Bulling Realtime Insights," Facebook Engineering's Notes, Jul. 19, 2011, http://www.facebook.com/note.php?note_id=10150103900258920.

"Real-Time Marketing, Simplified," Interaction Manager Overview, Toovio, Jul. 19, 2011, http://www.toovio.com/Interaction-Manager-Overview.

"Real-Time Event Tracking. Measure Actions, Not Page Views.," Mixpanel / Teal-Time Web Analytics, Funnel Analysis, Jul. 19, 2011, http://mixpanel.com.

Notice of Allowance on U.S. Appl. No. 13/239,293 dated May 8, 2013.

Notice of Allowance on U.S. Appl. No. 13/239,261 dated Jun. 18, 2013.

Notice of Allowance on U.S. Appl. No. 13/239,293 dated Sep. 20, 2013.

Office Action on U.S. Appl. No. 13/239,261 dated Nov. 29, 2012.
Office Action on U.S. Appl. No. 13/239,261 dated Apr. 5, 2013.
Office Action on U.S. Appl. No. 13/239,270 dated May 21, 2014.
Office Action on U.S. Appl. No. 13/239,270 dated Aug. 27, 2013.
Office Action on U.S. Appl. No. 13/239,293 dated Dec. 31, 2012.

* cited by examiner

TEMPORAL BASED DATA STRING INTERN POOLS

CROSS-REFERENCE TO RELATED APPLICATIONS

The present application claims the benefit of priority under 35 U.S.C. §119 from U.S. Provisional Patent Application Ser. No. 61/510,052 entitled "REAL-TIME ANALYTICS SYSTEM," filed on Jul. 20, 2011, the disclosure of which is hereby incorporated by reference in its entirety for all purposes.

BACKGROUND

Web site analytics involves the analysis and reporting of web site traffic data to an associated publisher. A publisher is an entity that owns and/or manages a particular web site. The publisher can monitor web site analytics data related to user visits and links to the web site by using web site analytics tools provided by third parties.

Existing web site analytics data systems work well for processing a high volume of web traffic data in order to provide interactive reports over substantial periods of time with high fidelity. However, these systems incur a high level of latency from hit occurrence to hit reporting, and also do not allow reports to segment in a fine and granular time basis. Consequently, existing web site analytics data systems have difficulty in monitoring sudden spikes or drops in traffic, or for tracking, for example, a propagation of a link to the publisher's web site over a social networking site, which can typically unfold in a time period of minutes.

Furthermore, the high latency of web site analytics reporting makes it more difficult for publishers to implement web site analytics on their web sites. Because it takes a longer period of time for reports to show up, publishers also often fail to notice any erroneous deployment of web site analytics tracking code on associated web sites.

SUMMARY

The subject technology provides for optimizing memory usage in a real-time analytics system over a rolling window of time. During a first time period, the subject technology performs a first set of operations. In particular, the subject technology determines whether a string associated with an event tracking data communication is stored within a first data structure in which the event tracking data communication includes event tracking data for tracking an activity associated with a source of the event tracking data communication. A first pointer is assigned to a matching string in the first data structure that matches the string in response to the string being stored in the first data structure. The string is stored in the first data structure in response to the string not being stored in the first data structure. During a second time period subsequent to the first time period, the subject technology performs a second set of operations including allocating a second data structure. The subject technology then determines whether a second string associated with a second event tracking data communication is stored within the second data structure. A second pointer is assigned to a matching string in the second data structure that matches the second string in response to the second string being stored in the second data structure. The second string is stored in the second data structure in response to the second string not being stored in the second data structure in which the first data structure is maintained for the duration of the second time period. Another aspect of the subject technology provides for managing memory allocation in a real-time analytics system over a rolling window of time. During a first time period, the subject technology allocates a first data structure and assigns a pointer to the first data structure. During a second time period, the subject technology allocates a second data structure and assigns a second pointer to a second data structure. The subject technology, during a third time period, allocates a third data structure and then assigns the first pointer to a third data structure.

The subject technology further provides a system for optimizing memory usage for storing event tracking data over a rolling window of time. The system includes a buffer module configured to queue and transmit event tracking data included in one or more event tracking data communications in which each event tracking data communication includes event tracking data for tracking an activity associated with a source of the event tracking data communication. The system includes a real-time analytics query engine configured to determine whether a string included in the event tracking data received from buffer module is stored in a first data structure, and to assign a first pointer to a matching string in the first data structure that matches the string if the string is stored in the first data structure. The system further includes a real-time analytics data storage module configured to store the string included in the event tracking data from the real-time analytics query engine if the string is not stored in the first data structure.

Additionally, the subject technology provides for, during a first time period, assigning a first pointer to a first data structure. The first data structure stores one or more different strings associated with event tracking data communications in which each event tracking data communication includes event tracking data for tracking an activity associated with a source of the event tracking data communication. The subject technology determines whether a string associated with an event tracking data communication is stored within a first data structure. A second pointer is assigned to a location in the first data structure that matches the string in response to the string being located in the first data structure. During a second time period subsequent to the first time period, the subject technology determines whether a second string associated with a second event tracking data communication is stored within the second data structure. A third pointer is then assigned to a location in the second data structure that matches the second string in response to the second string being located in the second data structure. The first data structure maintained during the second time period for one or more read operations.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

Figure 1:
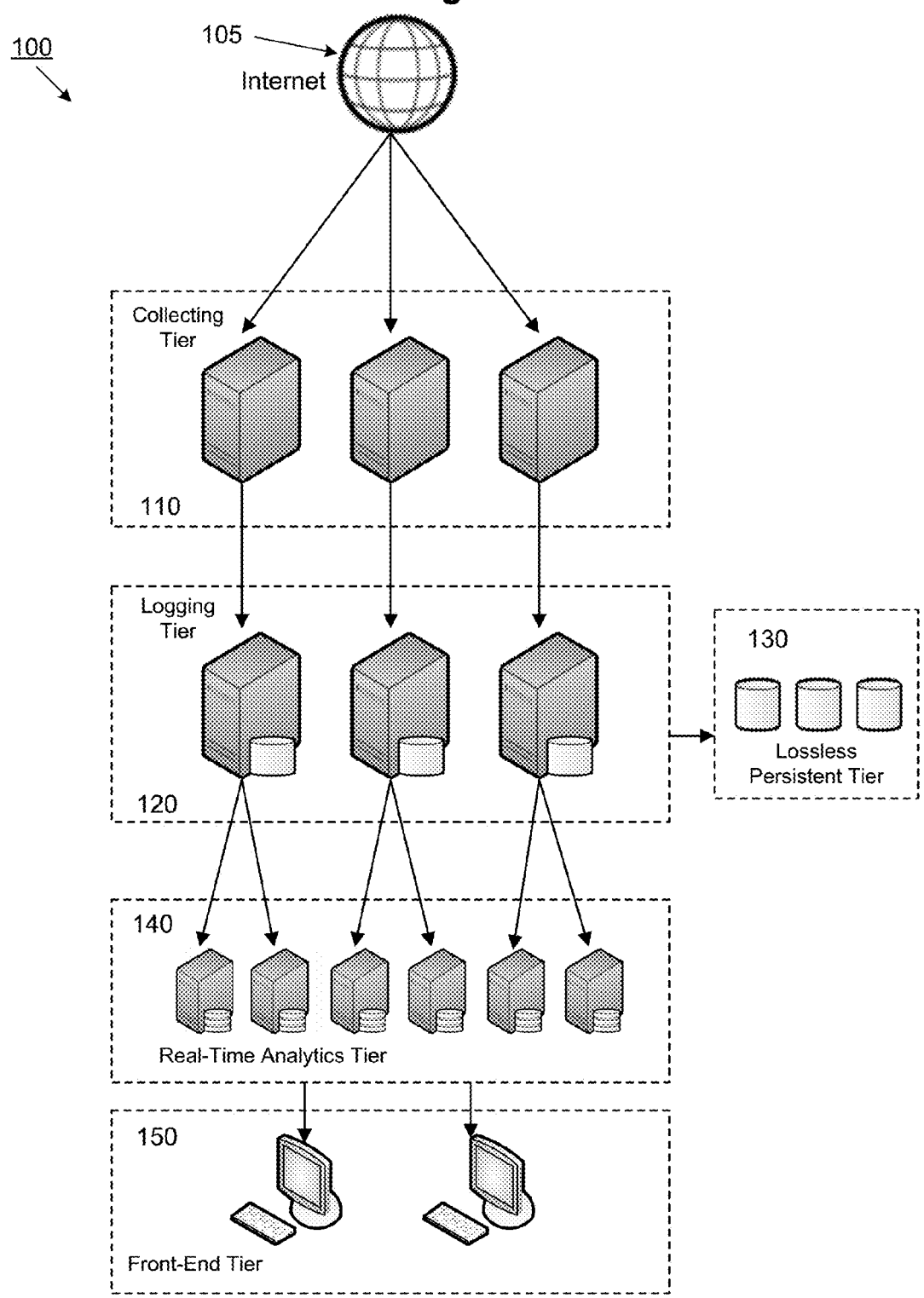
FIG. 1 illustrates an exemplary architecture diagram of a multi-tiered real-time analytics system of some configurations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Current analytics systems provide for aggregating and reporting of web site traffic data with high latency that can range from several hours to over a day. To address issues with high latency, a real-time analytics system for receiving and reporting web site traffic data with low latency is provided. More specifically, the real-time analytics system aggregates and reports web site traffic data by creating and maintaining multiple aggregation tables. These multiple aggregation tables can contain duplicate data that waste memory space and increase latency due to unnecessary operations (e.g., write) to memory. Therefore, a solution for decreasing the memory requirements for processing and storing data strings is desirable.

A real-time analytics system can repeatedly process data strings from web site traffic data. To optimize memory usage and improve the performance of the real-time analytics system, the subject technology is directed to configurations for providing temporal based data string intern pools that reuse data strings and decrease unnecessary operations to memory. In contrast, a scheme utilizing a non-temporal string intern pool does not free up memory based on a temporal constraint. Therefore, a temporal based data string intern pool is advantageous over a non-temporal string intern pool because the real-time analytics system can eventually reclaim the memory used by strings, while still receiving the memory-sharing advantage of utilizing a string intern pool for storing strings.

The real-time analytics system can store web site traffic data for a predetermined period of time (e.g., 60 seconds) in some configurations. A scheme for utilizing more than one temporal string intern pool for a time period larger than the predetermined period of time (e.g., 60 seconds or larger) is therefore feasible because the real-time analytics system only stores web site tracking data for the predetermined period of time. Therefore, it can be known a priori that web site tracking data is kept for approximately 60 seconds in one example. This is because a string allocated at the final moment of an older intern pool's time (e.g., "dead" intern pool as described below) will still be kept for at least 60 more seconds during the time period for a current intern pool (e.g., "live" intern pool as described below). Thus, it should be understood that by the time the "dead" intern pool is deleted or freed in memory, the real-time analytics system no longer utilizes the string data stored in the "dead" intern pool based on the a priori guarantee.

In some implementations, a real-time server allocates a first data structure (e.g., a table or array) for a given time period. For instance, the first data structure can store all strings processed by the real-time server for a 60 second time period. When an incoming web site tracking data communication includes a string for processing during the time period, the real-time server determines whether the first data structure includes the string. If not found, the string is stored in the first data structure. In the event that the string is located in the first data structure, a pointer is then assigned to the corresponding string from the web site tracking data communication instead of storing the string in the first data structure. In this manner, a string intern pool can provide a more efficient utilization of memory.

After the initial time period has elapsed, the real-time analytics server allocates a second data structure, which now represents a "live" data string intern pool for a subsequent given time period. The first data structure is then designated as a "dead" data string intern pool and the real-time system keeps respective pointers to the first and second data structures for future reference.

During the subsequent time period, associated strings of incoming communications are stored in the second data structure in the same manner as described above with respect to the first data structure. Similarly, in the event that a given string is found in the second data structure, a pointer is associated with the string instead of storing the string in the second data structure.

Additionally, during this time period, any strings in the dead intern pool can still referenced by the system if necessary. After the second time period has elapsed, the real-time analytics server 1) deallocates the memory corresponding with the first data structure, 2) designates the second data structure as the "dead" data string intern pool, and 3) allocates a third data structure as the "live" data string intern pool.

Again, the real-time system can process any strings associated with incoming web site tracking data communications in the same manner described above.

The strings may be stored using a compression mechanism such as a tree data structure. The creation and maintenance of such a compressed data structure is simplified and made possible by the fact that the data stored within each data structure is relevant for a known period of time (live period and dead period) before it is discarded and a new data structure is created.

To use a web site analytics data system, a publisher typically provides tracking instructions embedded in the web site's web pages (alternatively or conjunctively, by providing code in its web page that requests the tracking instructions from an analytics server). Typically, the tracking instructions are a small region of JavaScript™ code that the publisher includes in each page of the publisher's web site for which traffic is to be tracked. When a web page is rendered by a user device and/or client (e.g., web browsers, mobile devices, tablet devices, thin clients, thick clients, etc.), the tracking instructions are executed, which collects visitor data related to one or more different user sessions and sends it back to a real-time analytics server in the form of an event tracking data communication for processing. One method of sending the event tracking data communication is to send it as part of a Hypertext Transfer Protocol (HTTP) request.

Web site traffic data can be in the form of the aforementioned event tracking data communications (e.g., Hypertext Transfer Protocol (HTTP) requests that are generated from various user devices and/or clients). Each event tracking data communication can be triggered upon loading of a web page or resource (e.g., image file, banner ad, audio file, etc.) on the web site by a particular visitor to a publisher's web site. For the purpose of web site analytics reporting, the associated event tracking data (e.g., included in associated HTTP requests) can include a web property ID (e.g., an account identifier that identifies a publisher's analytics account of a particular web site), visitor identity data (i.e., corresponding to a particular user session), an event statistic(s) (such as a timestamp of the current web page communication), and user data such as location data (i.e., geographical information) associated with the visitor to the publisher's web site. The amount and types of events/information that are reported in the tracking data can be specified by the publisher (e.g., to account for particular information that a publisher wishes to track as web site analytics data).

Although an event tracking data communication is described as including web site traffic data, an event tracking data communication is not limited to including web site traffic data. In particular, an event tracking data communication can include data from any source (e.g., application, platform, etc.) that for tracking an activity associated with the source. For example, in a mobile application platform, an event tracking data communication can include event tracking data that tracks an event associated with an activity within the mobile application platform. In this example, the event tracking data associated with the mobile application platform may not include web site traffic data because the mobile application platform does not require the use of a client such as a web browser. Aspects of the multi-tiered real-time analytics system therefore can be configured to receive and process an event tracking data communication(s) including different forms of event tracking data that are outside the scope of web site tracking data.

A multi-tiered real-time analytics system as described herein can be configured to receive and process incoming event tracking data communications as described above to enable real-time reporting of web site analytics data with low latency. As used herein, the term "real-time" corresponds with reporting web site analytics data within a specified deadline by pushing/transmitting the web site analytics data through different tiers of the multi-tiered real-time analytics system. The expression "low latency" as used herein can be therefore understood as a measurement of time that covers a time period from the reception of an event tracking data communication to the real-time reporting of the web site analytics data included therein. As illustrated in FIG. 1 and described in further detail below, the flow of event tracking data goes through several tiers for real-time web site analytics processing and reporting.

A real-time system is subject to a "real-time constraint" that can impose operational deadlines from an event to a system response. Thus, a real-time system operates within constraints on response time. In the context of the multi-tiered real-time analytics system, the flow of event tracking data through different tiers of the system is required to meet deadlines in order to report the data within a specified period of time (e.g., in a real-time manner with low latency). In one example, the real-time analytics system imposes a respective one second deadline for processing event tracking data within each tier of the system. For instance, upon receipt of an event tracking data communication, a logging server (e.g., in a logging tier described further below) must forward the event tracking data communication within a one second deadline to a real-time server (e.g., in a real-time analytics tier described below). In the event that the logging server can not meet the one second deadline, the event tracking data communication is dropped (e.g., discarded) by the logging server and no further processing occurs for that event tracking data communication. Similarly, when the real-time server receives the event tracking data communication from the logging server, the real-time server must forward the event tracking data communication to another real-time server or a front-end server (as described below) within a one second deadline. The real-time server similarly discards the event tracking data communication if it can not meet the one second deadline. The one second deadline discussed above is just one example of the specified period of time. Other periods of time may be specified. In addition, each tier of the real-time analytics system may have a different specified period of time for processing an event tracking data communication.

FIG. 1 illustrates an exemplary architecture diagram of a multi-tiered real-time analytics system 100 for receiving and reporting web site traffic data in the form of event tracking data communications. The multi-tiered real-time analytics system 100 receives such event tracking data communications from a network 105 and routes the received communications for persistent and temporary storage to enable web analytics processing by the system. The network 105 can include, but is not limited to, a local network, remote network, or an interconnected network of networks (e.g., Internet as shown in FIG. 1).

As illustrated, the multi-tiered real-time analytics system 100 may further include a collecting tier 110, a logging tier 120, a persistent tier 130, a real-time analytics tier 140 and a front-end tier 150. Each of the aforementioned tiers can include a respective cluster of servers/computers that perform a same set of functions in a distributed and/or load balanced manner. A cluster can be understood as a group of servers/computers that are linked together to seamlessly perform the same set of functions, which can provide performance, reliability and availability advantages over a single server/computer architecture. For the sake of simplicity, each illustrated tier depicts several number of servers. However, one of ordinary skill in the art would realize that the illustrated tiers could include any number of servers and still be within the scope of the subject technology. The descriptions of the various tiers of the system 100 are explained in further detail below.

In some configurations, the collecting tier 110 receives incoming event tracking data communications from the network 105. The collecting tier 110 includes at least one collecting server that is configured to receive and forward the event tracking data communication. Each collecting server of the collecting tier 110 can process an incoming event tracking data communication to determine a particular server in the logging tier 120 to route the event tracking data communication. In some implementations, the collecting server can utilize a load balancing technique to determine which logging server in the logging tier 120 to route the event tracking data communication. The load balancing technique can be based upon different factors such as server load, network load, and/or any other suitable computing metric for measuring resource utilization at a particular server.

The logging tier 120 can receive a routed event tracking data communication from a particular collecting server of the collecting tier 110. Upon receiving the event tracking data communication, the subsequent tasks of the logging tier 120 can be understood as being two-fold: 1) route received event tracking data communications to the persistent tier 130 for persistent storage and 2) route received event tracking data communication to the real-time analytics tier 140 for temporary storage.

To accomplish the aforementioned tasks, the logging tier 120 includes at least one logging server that is configured to receive the routed event tracking data communication from the collecting server. In some implementations, the logging server aggregates incoming event tracking data communications and then periodically routes the aggregated event tracking data communications to the persistent tier 130 for persistent storage. Each event tracking data communication is associated with a particular web site of a publisher and the aggregated event tracking data communications can originate from disparate associated web sites and/or the same web site. In some implementations, the logging server can be further configured to verify each routed event tracking data communication to guarantee delivery of the event tracking data communications to a particular long-term storage server in the persistent tier 130.

For persistent storage of the event tracking data communication, the persistent tier 130 of some configurations can include at least one long-term storage server. Each long-term storage server includes a non-volatile storage device(s), a database(s), or other similar non-volatile storage medium for persistent storage of an incoming event tracking data communication. Persistent storage as used herein can be understood as referring to a type of non-volatile storage that stores the event tracking data in a reliable manner. In some configurations, persistent storage can include lossless or near-lossless storage in which the data is stored without being deleted and/or replaced at a subsequent time period. Additionally, persistent storage can be characterized as storing event tracking data in a form of historical records so that the system can extract the stored tracking data at a later period of time. In some configurations, the stored event tracking data can be modified at a later time period. Alternatively, the stored event tracking data can be in the form of immutable records (i.e., data that is not modified after being stored).

To improve the reliability of the persistent storage, some implementations of the persistent tier 130 can replicate the stored event tracking data across another long-term storage server so that the tracking data is mirrored in at least one other long-term storage server. For instance, the long-term storage server that receives a particular event tracking data communication can then undergo a replication process (either initiated by the long-term storage server itself, a second long-term storage server, or another server in the multi-tiered system) to copy (i.e., replicate) the particular event tracking data to another long-term storage server. Data redundancy can therefore can be provided to enable fault tolerance in the event the data stored at one long-term storage server is corrupted and/or lost.

To meet the low latency requirements for a multi-tiered real-time analytics system, the system can employ a lossy scheme for reporting web site traffic data in which some loss of event tracking data is tolerated. In particular, because the event tracking data is stored in persistent storage as described above, the multi-tiered real-time analytics system can adopt certain trade-offs for the sake of minimizing latency when routing the event tracking data to the real-time analytics tier as described further below.

Each logging server of the logging tier 120 is further configured to route event tracking data communications to the real-time analytics tier 140 for temporary storage. Given the requirement of low latency (i.e., minimizing latency in the system) connected with reporting real-time analytics data, each logging server can be configured to route the event tracking data communications to the real-time analytics tier 140 at a greater frequency than routing the communications to the persistent tier 130. In some implementations, routing the tracking data communications to the real-time analytics tier 140 can be understood as occurring asynchronously with routing the communications to the persistent tier 130.

The real-time analytics tier 140 includes at least one real-time server that is configured to receive the routed event tracking data communication from the logging tier 120. The real-time server in some implementations is configured to aggregate and/or sort the event tracking data according to one or more predetermined criteria for real-time reporting of the web site analytics data to a publisher. As described before, each event tracking data communication can include visitor identity data corresponding to a user session, location data associated with the user/visitor, and a timestamp corresponding to the visitor action.

The real-time server of some implementations can process the aforementioned data to generate real-time analytics data for temporary storage. For instance, the real-time server can aggregate and sort the location data according to the timestamp of the visitor action and then temporarily store the aggregated and/or sorted real-time analytics data. One of ordinary skill in the art would appreciate that other criteria can be used for aggregating and sorting the real-time analytics data. In one aspect, the real-time server sends the aggregated and/or sorted real-time analytics data to the front-end tier 150 for reporting the real-time analytics data. Moreover, as used herein, temporary storage can be understood as providing volatile, quick access to data (in comparison to persistent storage) stored in a storage device such as volatile memory (e.g., random access memory).

Alternatively to the above, the front-end tier 150 in one aspect can run queries on the stored real-time analytics data to report to the publisher with low latency. For instance, the real-time server can be configured to process incoming queries from the front-end tier on the stored real-time analytics data. The real-time server can return matching real-time analytics data based on the queries to the front-end tier 150 for real-time presentation with low latency.

In some implementations, the system 100 includes the front-end tier 150, which includes at least one front-end server configured to report the real-time analytics data with low latency. As described above, the front-end server of some implementations is configured to receive real-time analytics data from the real-time server. By way of example, the front-end server can receive real-time web analytics data associated with a particular location (e.g., city, state, country, etc.) over a predetermined time period for presentation at a front-end interface (i.e., graphical user interface) to an end-user. One of ordinary skill in the art would understand that any set of real-time analytics data could be received for reporting the analytics data in a real-time manner.

Although the above description provides that system 100 includes several tiers, one of ordinary skill in the art would appreciate that in some configurations respective tiers could be combined to function as a single tier and still be within the scope of the subject technology. For instance, the above described collecting and logging tiers could be implemented as a single tier that perform a combined set of functions.

Moreover, to facilitate communication between the respective tiers as described above, the respective tiers can be configured to communication over a type of network, such as a local area network, a wide area network, or an interconnected network of networks (e.g., the Internet) and by using any sort of network/communications protocol (Transmission Control Protocol and Internet Protocol (TCP/IP), HTTP, etc.).

In addition, different configurations of the multi-tiered system can be organized in different ways. For instance, different tiers could be located in different geographical locations. Each geographical location can be associated with a respective data center that includes one or more servers associated with a particular tier. Alternatively or conjunctively, the respective servers in one particular tier could be located in one or more different geographical locations and/or data centers. This flexibility in organizing the multi-tiered system provides an advantage of increasing the scalability of the system to include servers across potentially disparate physical locations.

In the following section, respective exemplary processes for routing an event tracking data communication to a real-time server and processing the tracking data communication by the real-time server are described in further detail.

Figure 2:
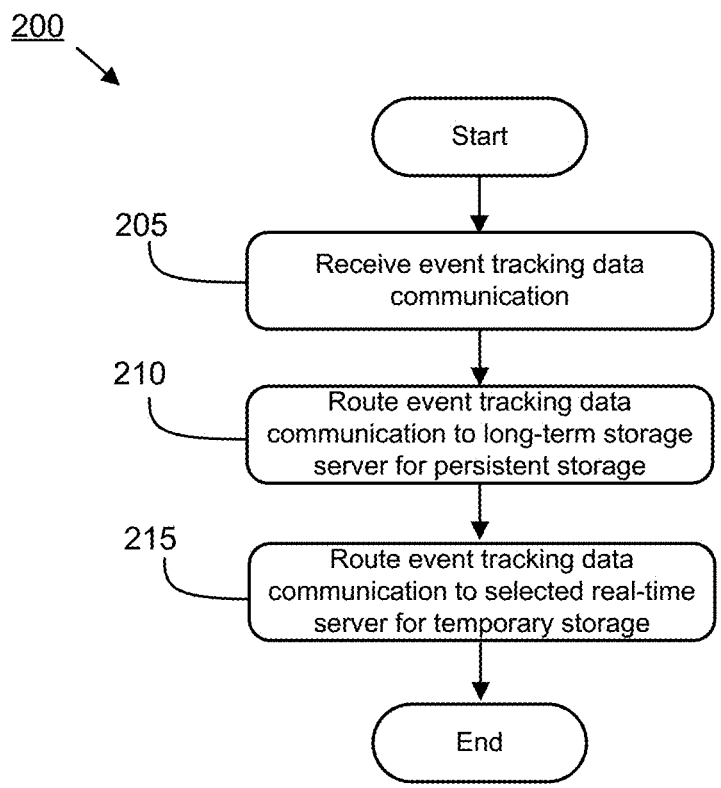
FIG. 2 conceptually illustrates an exemplary process for routing an event tracking data communication for persistent and temporary storage of some configurations.

FIG. 2 conceptually illustrates an exemplary process 200 for routing an event tracking data communication for persistent and temporary storage of some configurations. More specifically, FIG. 2 illustrates the process performed by a logging server to route event tracking data communications to a persistent tier and to a real-time analytics tier. The process 200 of FIG. 2 will be described by reference to corresponding portions of FIG. 1.

The process 200 starts when an event tracking data communication is received at 205. By reference to FIG. 1, the logging server in the logging tier 120 receives the event tracking data communication from a collecting server in the collecting tier 110. In some implementations, the logging server can receive the web site communication when pushed from the collecting server. For example, instead of the logging server utilizing a client pull technique to request an event tracking data communication, the tracking data communication is pushed as a server push from the collecting server to the logging server. Hence, the latency of receiving the event tracking data communication is decreased because the aforementioned data flow reduces the typical overhead associated with a traditional request/response communication flow.

The process 200 can then perform the task of routing the received web site to separate tiers. At 210, the event tracking data communication is routed to a long-term storage server (e.g., in the persistent tier 130 from FIG. 1) for persistent storage. Referring to FIG. 1, the logging server in the logging tier 120 routes the event tracking data communication to the long-term storage server in persistent tier 130. In some implementations, the logging server can queue several received event tracking data communications for routing the tracking data communications in a batch manner. When the logging server performs the steps in the process 200, some implementations can further verify the delivery of the event tracking data communication to the long-term storage server in order to guarantee the delivery of the communication.

The process 200 then continues to 215 to route the event tracking data communication to a selected real-time server. Referring to FIG. 1, the real-time analytics tier 140 can include several real-time servers. The logging server in the logging tier 130 can arbitrarily select a real-time server to route the event tracking data communication. By performing an arbitrary selection of the real-time server, latency in reporting real-time analytics data can be decreased because the process 200 does not rely on any particular real-time server to process the tracking data communication. The arbitrary selection of the real-time server by the process 200 also alleviates potential processing bottlenecks by impartially distributing the event tracking data communications across the real-time servers in the real-time analytics tier 140 from FIG. 1. In some configurations, the real-time server can be selected based on different criteria. For example, the logging server can select the real-time server using a randomized selection in which a particular real-time server is randomly selected from among more than one different real-time servers. In yet other configurations, the logging server can select the real-time server based on load-balancing requirements in which one or more particular computing metrics are utilized to determine the real-time server to receive the event tracking data communication.

Additionally, the process 200 at 215 can route the event tracking data communication at a greater frequency than routing the communication to the long-term storage server. For example, when the logging server receives the event tracking data communication, the logging server can queue several tracking data communications before sending them to the long-term storage server because low latency is not a factor for the aspect of the multi-tiered system dealing with persistent storage of the event tracking data. In one aspect, the logging server can immediately or in a shorter time period route the event tracking data communication to the randomly selected real-time analytics server to ensure that the requirement of low latency processing, storing and reporting of the real-time analytics data is met. After routing the event tracking data communication to the long-term storage server and the real-time server, the process 200 then ends.

Although the above description of the process 200 describes that routing to the long-term storage server occurs before routing to the real-time server, one of ordinary skill in the art can appreciate that the described order is one exemplar and some implementations could reverse the order of the previously described routing without departing from the scope of the invention. For instance, some implementations could route the event tracking data communication to the real-time server before routing the communication to the long-term storage server. In another aspect, routing the communication to the long-term storage server and the real-time server occurs in a simultaneous and/or synchronous manner.

Figure 3:
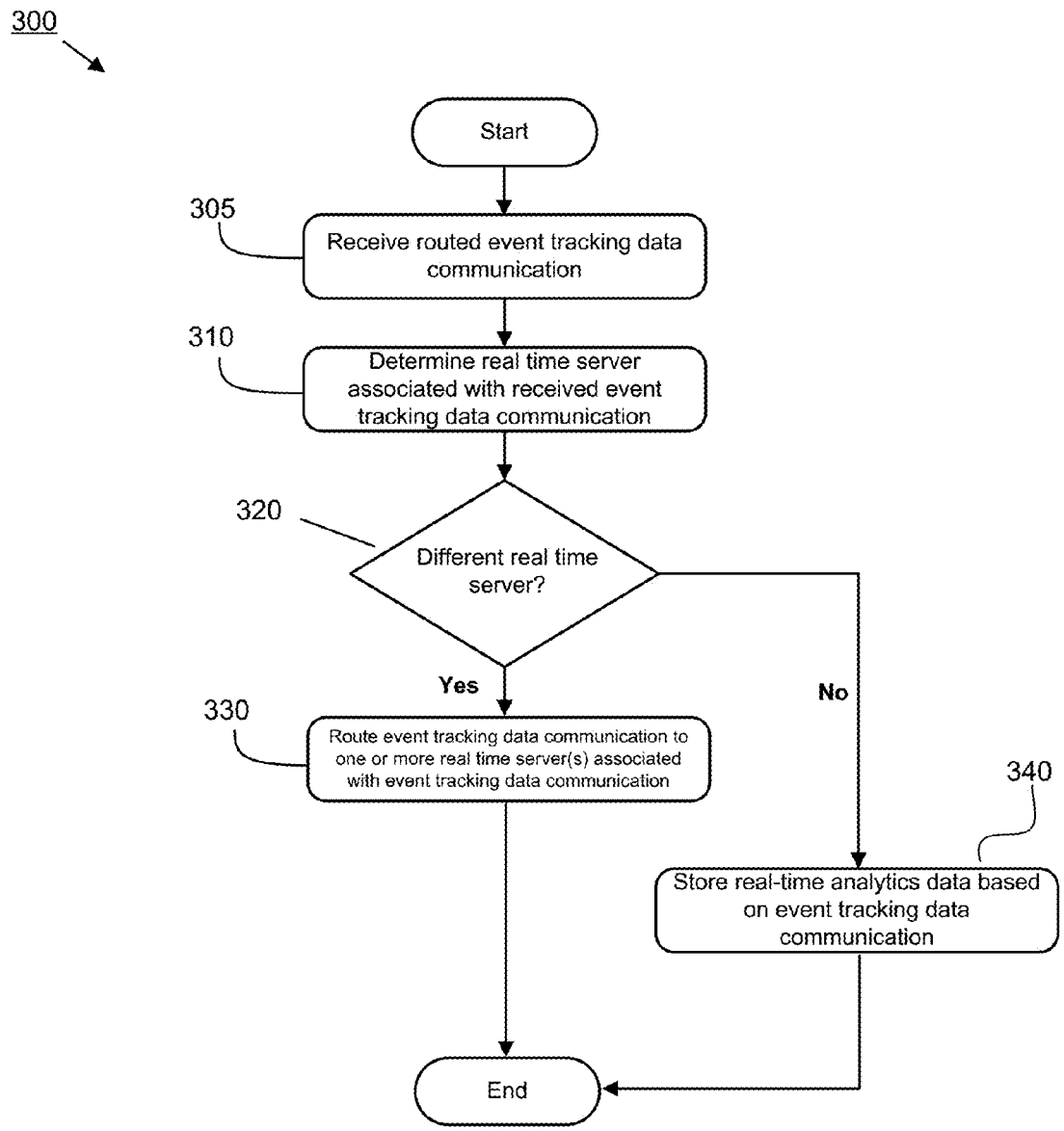
FIG. 3 conceptually illustrates an exemplary process for processing an event tracking data communication in a real-time server of some configurations.

The following discussion describes an exemplary process for processing and storing an event tracking data communication received by an arbitrarily selected real-time server. In some configurations, after the event tracking data communication is routed to the arbitrarily selected real-time server as described above in FIG. 2, the process illustrated in FIG. 3 is performed by the real-time server. More specifically, FIG. 3 conceptually illustrates an exemplary process 300 for processing an event tracking data communication in a real-time server.

The process 300 begins when a routed event tracking data communication is received at 305 in a selected real-time server. For instance, the real-time server can receive the event tracking data communication when the communication is pushed from the logging server to the real-time server. As similarly discussed above in connection with FIG. 2, the logging server can employ a push technique to push event tracking data communications to the arbitrarily selected real-time server. In other words, by pushing the event tracking data communication, the logging server initiates a communication flow without requiring an initial request from the recipient (i.e., the arbitrarily selected real-time server). Thus, an associated overhead of a typical request/request communication flow can be eliminated in the multi-tiered system. As a result, latency is reduced in the system for processing and reporting real-time analytics data.

At 310, the process 300 determines the real-time server(s) associated with the event tracking data communication. In some implementations, a real-time server(s) can be associated with a web site of a particular publisher. For instance, the real-time server can consult a table, list or other suitable data structure that indicates one or more real-time servers that are associated with the publisher's web site. The associated one or more real-time servers therefore can be considered an "owner" of any event tracking data communication for that publisher's web site. In practical terms, when acting as the owner, the associated real-time server is required to process each event tracking data communication for that publisher's web site. Based on the determination at 310, the process 300 can decide at 320 whether a different real-time server is associated with the received event tracking data communication.

In an instance in which the process 300 determines at 320 that the real-time server is not associated with the event tracking data communication, the process 300 continues to 330. At 330, the process 300 routes the event tracking data communication to one or more real-time servers associated with the event tracking data communication based on the determination at 310. Referring to FIG. 1, the real-time server can route the event tracking data communication to the associated one or more real-time servers in the real-time analytics tier 140. The process 300 then ends.

Alternatively, in an instance in which the process 300 determines at 320 that the real-time server is associated with the event tracking data communication, the process 300 continues to 340 to temporarily store real-time analytics data based on the event tracking data communication. A more detailed description of exemplars of the real-time analytics data will be discussed below in connection with FIG. 4 below. In some implementations, the process 300 temporarily stores the real-time analytics data in non-persistent storage (e.g., volatile memory, RAM, etc.). After storing the event tracking data communication, the process 300 then ends.

Although the above description describes that the process 300 determines an associated owner of the event tracking data communication at 320, one of ordinary skill in the art can appreciate that in some implementations this step is not performed (i.e., process 300 foregoes 310-330) and the process 300 immediately proceeds to 340 to store the event tracking data communication. In such implementations, the real-time server that receives the communication assumes ownership of the received communication.

The following section describes exemplar attributes and data structures of the real-time analytics data. An associated real-time server can temporarily store such attributes and data structures illustrated in FIG. 4 for reporting real-time analytics data.

Figure 4:
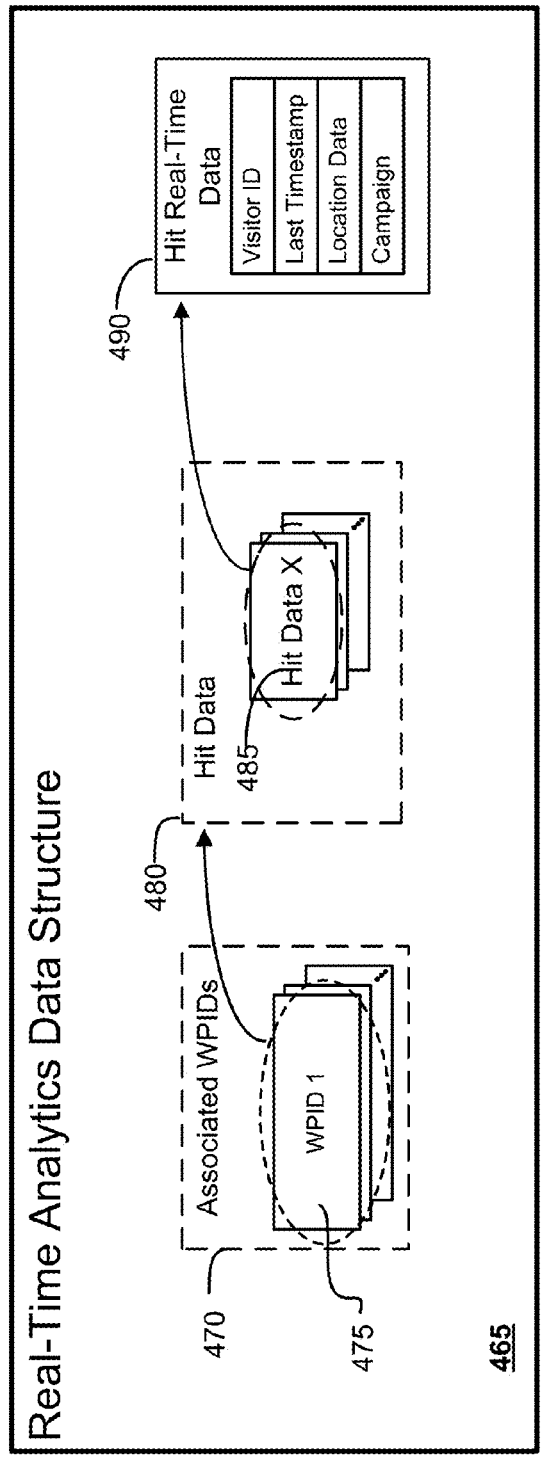
FIG. 4 conceptually illustrates different attributes and data structures that are included in some configurations of the multi-tiered real-time analytics system.

FIG. 4 conceptually illustrates different attributes and data structures that are included in some configurations of the multi-tiered real-time analytics system. More specifically, FIG. 4 depicts exemplar attributes and data structures of a real-time analytics data structure 465 that are based on event tracking data communications. For instance, an event tracking data communication can include data for identifying a user session of a visitor, a location of the visitor, and other real-time analytics attributes. A real-time server can temporarily store the real-time analytics attributes and data structures shown in FIG. 4 based on the aforementioned data included in the event tracking data communication.

In some implementations, the real-time analytics data structure 465 can be understood as a container that is a collection of the various attributes and data structures based on one or more event tracking data communication(s). As shown in FIG. 4, the real-time analytics data structure 465 includes an associated web property identity (WPID) data structure 470, associated WPID attribute 475, hit data structure 480, hit data element 485 and hit real-time data attributes 490. Although these attributes and data structures are represented as included in a single data structure, some implementations can store each of the attributes and data structures in separate data structures that include any combination of data attributes. The aforementioned attributes and data structures are described in further detail as set forth below.

As illustrated, the associated web property identity (WPID) data structure 470 includes one or more associated WPID attributes. Each associated WPID attribute can represent a publisher of a web site which is associated with the real-time server. As shown, the associated WPID attribute 475 corresponds with a publisher with a "WPID 1" that represents a unique string ID for the publisher. One of ordinary skill in the art would understand that the unique string ID could be formed from any combination of alphanumeric characters and/or symbols.

In some implementations, each associated WPID attribute can include a reference to the hit data structure 480. The hit data structure 480 includes attributes for each event tracking data communication for the publisher. As shown, the hit data structure 480 includes hit data element 485 corresponding to a particular event tracking data communication "X" for the publisher corresponding with associated WPID attribute 475. The hit data element 485 is shown in more detail in breakout section 490.

As further shown in FIG. 4, the hit data element 485 can include the real-time data attributes 490 corresponding to a visitor ID, a last timestamp, location data and campaign data. The visitor ID attribute represents a unique ID string associated with a unique visitor session. The visitor ID attribute does not necessarily identify a particular end-user but instead corresponds with a particular user session on the publisher's web site. For example, the visitor ID can be a randomized identifier that is determined based on different information such as the visitor's web browser or client, the timestamp associated with the visitor's session, and/or the visitor's hostname, etc. Additionally, the location data does not identify the visitor's personal address, but is related to a geographical location (e.g., city) that can be determined based on the IP address assigned to the visitor (e.g., by an Internet service provider).

Next, the last timestamp attribute of the real-time data attributes 490 represents the most recent timestamp in which the unique visitor visited the publisher's web site. A timestamp in some implementations is a sequence of alphanumeric characters that denotes the date and/or time in which a particular event occurred. The location data attribute represents the geographical location of the unique visitor, such as a specified city, state, county, country, zip code, global positioning system coordinates, and/or geographical coordinates (e.g., latitude, longitude, elevation), etc. Lastly, the campaign attribute identifies a particular marketing campaign corresponding with a set of associated marketing activities. For instance, the associated marketing activities can respectively correspond to a set of web pages on the publisher's web site. Any visitor activity/action related to the set of web pages on the publisher's web page can then be associated with the marketing campaign. In this manner, the campaign attribute can identify the marketing campaign associated with the visitor action.

Different implementations can implement and organize the above described attributes and data structures in different ways. For instance, the real-time analytics data structure 465 of some configurations can be implemented as a collection of tree data structures, otherwise known as a "forest." In this exemplar, a root node of a particular tree corresponds with a particular WPID (i.e., publisher identity) and each direct child of the root node can represent multiple visitor nodes that are associated with respective visitors to the publisher's web site. For each visitor node, visitor specific attributes are stored. Each visitor node can have multiple direct child nodes that represent the associated visitor's actions based on a timestamp. The timestamp of the last action for the associated visitor can also be stored with the parent associated visitor node described above. Alternatively or conjunctively, certain visitor attributes can be implemented as discrete nodes, such as a node including a city identifier with respective direct child nodes corresponding to a city name and geographical coordinates (e.g., latitude, longitude, etc.).

The following description describes an exemplary process for segmenting incoming event tracking data communications according to a predetermined aggregation table over a rolling window of time. In some instances, an administrator of the multi-tiered analytics system can set one or more different aggregation tables for storing different data from the incoming communications received during a specified period of time. Incoming event tracking data communications can be processed in order to extract relevant data into such aggregation tables. Each aggregation table can include corresponding event tracking data that is frequently searched/queried in reporting real-time analytics data. For instance, data related to a derived location (e.g., based from an associated Internet Protocol address from an Internet service provider), a uniform resource locator or identifier (e.g., a web page address), or an ad source (e.g., referrer) can be placed into one or more different aggregation tables.

In some instances, an administrator of the multi-tiered analytics system can set the order in which the aggregation tables are searched. In particular, the administrator can configure the system so that aggregation tables containing data that is reported more often are searched before aggregation tables containing data that is searched and reported less frequently. It should be understood that system latency can be reduced because more frequently reported data is initially searched and/or located, which reduces processing time because the system forgoes searching unlikely matching data. Thus, the multi-tiered analytics system enables prioritization in searching/querying of the event tracking data to improve latency in reporting the web analytics data.

Alternatively or conjunctively, a predetermined query can be configured by a publisher for segmenting event tracking data from incoming event tracking data communications according to different needs of the publisher. In some instances, the utilization of the predetermined query can require the creation of a custom aggregation table for storing the type of data according to the predetermined query. Similarly, the exemplary process described below can place the segmented tracking data into one or more different aggregation tables (e.g., tables that are created before the predetermined query as described above). For example, the publisher can configure the predetermined query to segment the event tracking data according to different user information and/or different visitor actions. By way of example, the publisher could be interested in segmenting each geographical location associated with respective web page requests or segmenting the event tracking data to track a number of requests to a particular web page resource (e.g., banner ad, image, etc.). The segmented event tracking data based on the predetermined query can be subsequently reported to the publisher in a real-time manner. By configuring one or more different predetermined queries, time can be saved in reporting event tracking data by reducing the administrative costs with managing the real-time analytics system.

Figure 5:
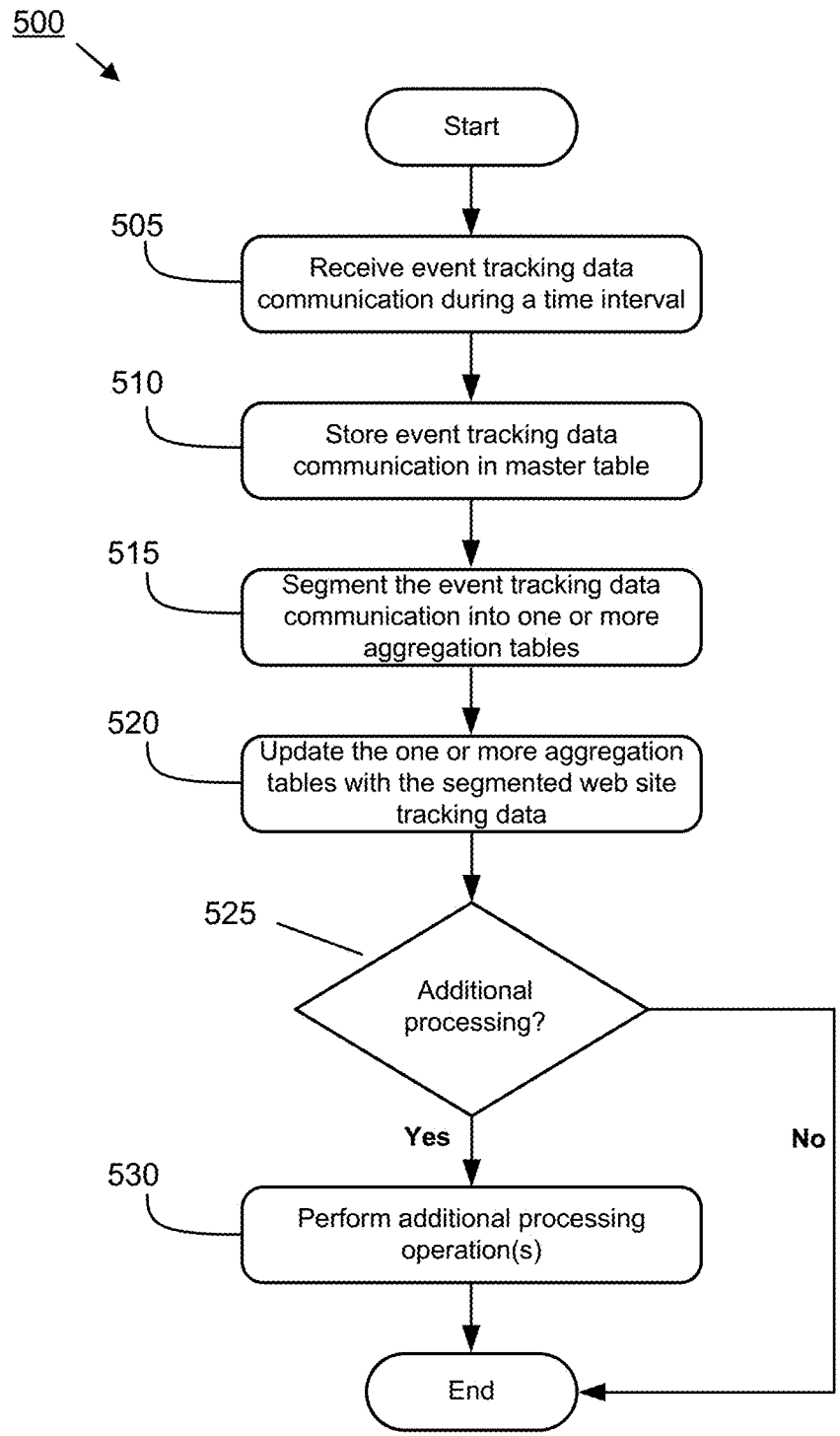
FIG. 5 conceptually illustrates an exemplary process for segmenting event tracking data over a rolling period of time for real-time analytics reporting of some configurations.

To organize the event tracking data into a contextually meaningful format for reporting the real-time analytics data with low latency, the exemplary process described below can segment the event tracking data communication into one or more aggregation tables. FIG. 5 conceptually illustrates an exemplary process 500 for segmenting event tracking data over a rolling period of time for real-time analytics reporting of some configurations. More specifically, over a rolling period of time, the process 500 continuously segments the event tracking data included in incoming event tracking data communications into one or more aggregation tables. The rolling period of time represents one or more contiguous time intervals in which the event tracking data is received and reported by the multi-tiered analytics system. Each time interval can correspond with a respective duration of time such as a number of milliseconds, seconds, minutes, etc. For example, the exemplary process in FIG. 5 can be implemented by a real-time server to segment real-time analytics data into an aggregation table(s) corresponding to a particular span of time.

The process 500 starts when an event tracking data communication is received at 505 during a span of time. The span of time in some configurations corresponds with a time interval during which web traffic data in the form of an event tracking data communication(s) is received by the multi-tiered analytics system. By reference to FIG. 1, a real-time server in the real-time analytics tier 140 receives the event tracking data communication from a logging server in the logging tier 120. In some implementations, the real-time server can receive the event tracking data communication when pushed from the logging server as mentioned before. Although the real-time server can receive the communication from the logging server, one of ordinary skill in the art would recognize that the event tracking data communication can be received from other sources and still be within the scope of the subject technology. For instance, in some configurations, the real-time server can receive the event tracking data communication from another real-time server.

At 510, the process 500 can store the event tracking data into a master table for a particular span of time. The master table of some configurations includes all data from the event tracking data communication that could be utilized for real-time analytics reporting. The process 500 could utilize the master table for different operations. For instance, in a scenario in which the process 500 requires different data than data currently included in existing aggregation tables (e.g., to satisfy a new user-defined query), the process 500 could search the master table for such data and form a new aggregation table to hold the data.

The process 500 at 515 segments the event tracking data communication into one or more aggregation tables. To accomplish this task, the process 500 can extract corresponding event tracking data included in the communication and place the extracted data into one or more aggregation tables. As discussed above, each aggregation table can include commonly search for data for real-time analytics reporting, or include data according to a respective predetermined query (i.e., a user-defined query). The predetermined query of some configurations organizes the event tracking data based on one or more different criterion for an associated web property ID of a publisher's web site. For instance, the predetermined query can be based on user data, such as a city or other geographical location of the user. By way of example, the process 500 of some configurations segments the event tracking data communication according to a predetermined period of time for a respective associated web property ID of a publisher. In particular, the process 500 can utilize a time stamp of the event tracking data communication in order to determine the one or more aggregation tables in which the tracking data is segmented.

After segmenting the event tracking data, the process 500 at 520 updates the one or more aggregation tables with the segmented event tracking data. For instance, the process 500 can update one or more different entries in a particular aggregation table. In an example in which the particular aggregation table tracks a number of occurrences for a particular event or visitor action, the process 500 can increment a respective number/count for a particular tracked event such as a number of hits in a corresponding entry of the aggregation table. For each incoming event tracking data communication over the rolling window of time, the process 500 continuously updates corresponding entries in one or more aggregation tables to facilitate real-time analytics reporting of the event tracking data with low latency.

The process 500 then continues to 525 to determine whether an additional operation(s) is to be performed on the event tracking data. If an additional operation is performed, then the process 500 continues to 530 to perform the additional operation, otherwise the process 500 ends. Some configurations can perform filtering (e.g., removing/reducing data), sorting (e.g., ranking) and other types of processing operations on the event tracking data. For instance, the process 500 can rank the segmented event tracking data to organize the event tracking data into a specified order (e.g., most occurrence, most significant, etc.) by sorting the segmented web site track data. In an example in which the aggregation table tracks the corresponding number of hits for events or visitor actions, the process 500 can sort the segmented event tracking data according to the number of hits (e.g., ascending or descending numerical order). Alternatively, the process 500 can sort the segmented event tracking data based on a non-numerical criterion (e.g., alphabetical order), such as sorting the geographical locations respectively associated with the event tracking data in the aggregation table.

Additionally, the process 500 of some configurations can employ intelligent ranking at 530 by computing and/or assigning weights to the segmented data. One or more different factors can determine an assigned weight such as a web page associated with the visitor activity (e.g., more important pages get assigned higher/greater weight), the type of visitor activity (e.g., browsing, commenting, etc.), referrer (e.g., where the visitor came from), etc. Hence, it can be understood that the event tracking data can be qualitatively ranked according to one or more different assigned weights to respective data. The process 500 can perform qualitative ranking of the segmented data in addition or alternatively to the quantitative ranking described above.

In some configurations, the process 500 can transmit at 530 the segmented event tracking data in the corresponding aggregation table to a front-end server for reporting the event tracking data. By way of example, the process 500 can receive a query from the front-end server for the event tracking data and, in response, can transmit data that matches the query to the front-end server. Alternatively or conjunctively, the process 500 can be configured to push data from one or more aggregation tables to the front-end server without requiring the front-end server to request the data. The process 500 then ends.

Although the process 500 is described in FIG. 5 as performing the one or more additional operations after updating the aggregation tables at 520, one of ordinary skill in the art would appreciate that any of the aforementioned additional operations could be performed after receiving the event tracking data communication at 505 and/or before segmenting the event tracking data at 515. In some configurations, another operation could be performed in lieu of segmenting the event tracking data at 515. For instance, the process 500 could instead filter the event tracking data to remove data according to one or more different filter criteria. In this fashion, the process 500 could reduce the amount of event tracking data that is to be segmented at 515 to enable more efficient processing of the data.

The following description discusses exemplary data structures utilized by the process 500 described above in FIG. 5 for processing event tracking data included with incoming event tracking data communications. Over a rolling window of time, the multi-tiered real-time analytics system can temporally use corresponding aggregation tables for reporting the event tracking data with respect to a span of time.

Figure 6:
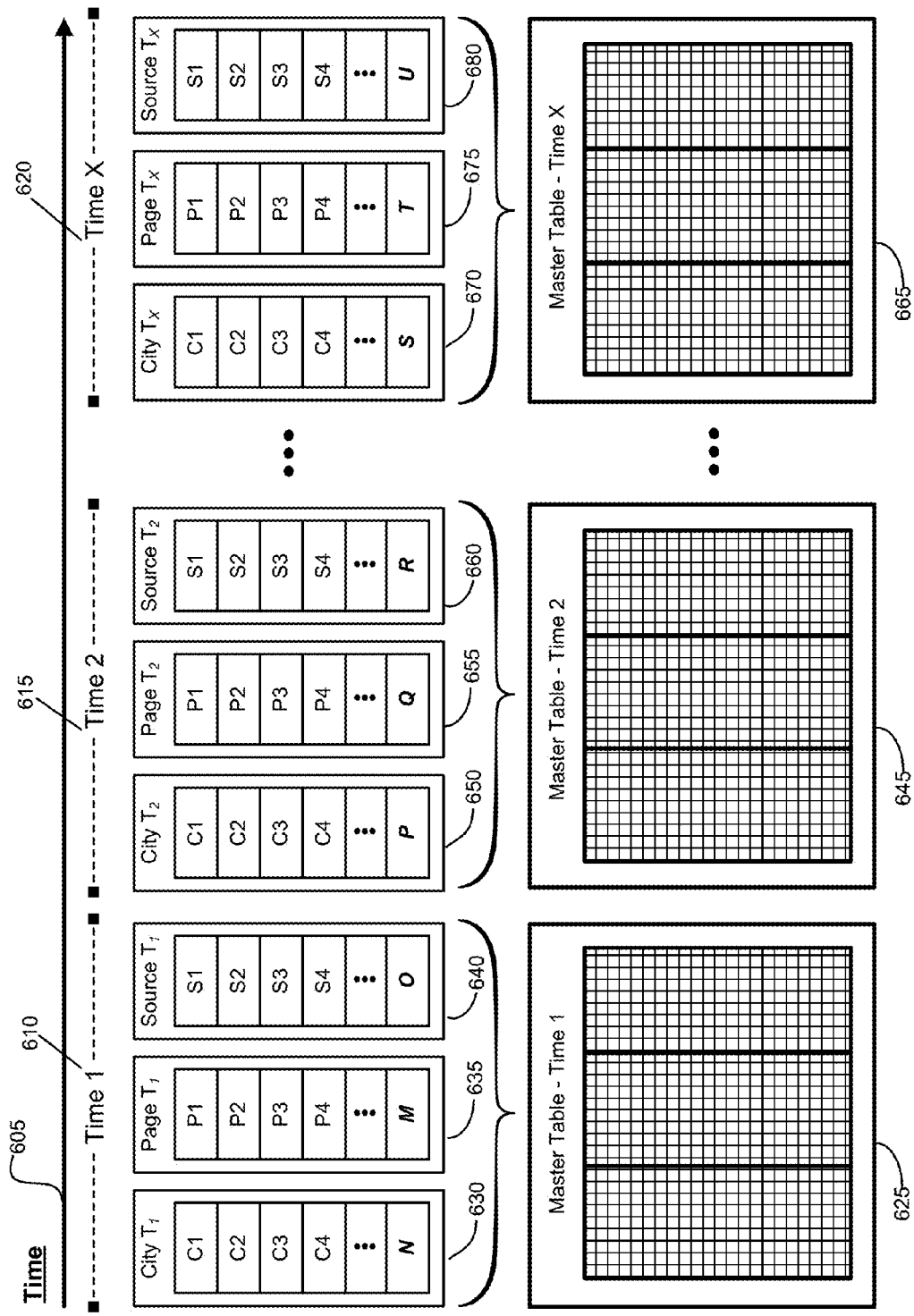
FIG. 6 conceptually illustrates exemplary data structures for one or more aggregations tables over a rolling window of time of some configurations.

FIG. 6 conceptually illustrates exemplary data structures for one or more aggregation tables over a rolling window of time of some configurations. In particular, FIG. 6 depicts a continuous timeline 605 divided into different time intervals 610, 615 and 620 (shown as Time 1 to Time X, where X is a positive integer) in which each respective time interval has associated aggregation tables for a given web property ID. Each associated aggregation table corresponds with a given time interval and includes data for one or more dimensions. A dimension can be understood as including data organized by a particular characteristic in a respective category in which the characteristic can fall under the respective category. For instance, aggregation tables can include respective dimensions related to geographical location, web page, browser, ad source, time, type of visitor activity, etc. By way of example, for the browser category, data that indicates the browser is "Internet Explorer" could be a characteristic that falls under the browser category.

Each time interval shown in FIG. 6 can represent a span of time such as, but not limited to, a number of milliseconds, seconds, minutes, etc., in which incoming event tracking data communications are segmented and processed. The real-time analytics system can configure the time interval for processing incoming event tracking data communications based on particular characteristics of the publisher's web site, and each time interval could represent the same or non-equal periods of time depending on these characteristics. For example, for a given web site with a pattern of web site traffic, a shorter time interval(s) can be set for time periods with more web site traffic while a longer time interval(s) can be set for time periods with less web site traffic. Although the time intervals 615 to 620 are shown in FIG. 6 as contiguous time intervals, some configurations can include overlapping time intervals.

As shown, the time interval 610 has several associated aggregation tables 630, 635, 640 and a master table 625. The master table 625 is formed during the time interval 610 to store all data from each received event tracking data communication during the time interval 610. In some configurations, the real-time analytics system can utilize the master table in the event that the desired event tracking data is not available in any other associated aggregation table for the time interval 610. In this instance, the real-time analytics system can search/query the master table to create a new aggregation table to store this newly segmented data. In some configurations, after this new aggregation table is created, an analogous new aggregation table is created for the each of the remaining time intervals. For example, new respective analogous aggregation tables in the time intervals 615 to 620 can be subsequently created by searching corresponding master tables for the desired event tracking data.

The associated aggregation tables 630, 635 and 640 represent exemplary data structures for storing portions of data (i.e., segmented data) also included in the master table 625. Each aggregation table can include segmented data extracted from incoming event tracking data communications. As illustrated, the aggregation tables 630, 635 and 640 respectively include tracking data related to a city (e.g., geographical location), web page (e.g., URL/URI string indicating a web address) and source of a referral (e.g., an ad source, HTTP referrer, etc.). The exemplary aggregation tables in FIG. 6 can include one or more entries. As illustrated, the aggregation tables 630, 635 and 640 respectively include N, M and O number of entries, where N, M and O are respective non-zero integer values. More specifically, the aggregation table 630 includes entries C1-C4 up to N entries for respective cities, the aggregation table 635 includes entries P1-P4 up to M entries for respective pages, and the aggregation table 640 includes entries S1-S4 up to O entries for respective sources.

For each subsequent time interval, one or more aggregation tables can be utilized that are respectively analogous to the same aggregation tables used in a prior time interval. For instance, aggregation tables 650, 655 and 660 in the time interval 615, and aggregation tables 670, 675 and 680 in the time interval 620 respectively represent analogous data structures to the aggregation tables 630, 635 and 640 in the prior time interval 610. As shown, the aggregation tables 650, 655 and 660 respectively include P, Q and R number of entries, where P, Q and R are respective non-zero integer values. More specifically, the aggregation table 650 includes entries C1-C4 up to P entries that represent respective cities, the aggregation table 655 includes entries P1-P4 up to Q entries that represent respective pages, and the aggregation table 660 includes entries S1-S4 up to R entries that represent respective sources. Similarly, the aggregation table 670 includes entries C1-C4 up to S entries that represent respective cities, the aggregation table 675 includes entries P1-P4 up to T entries that represent respective pages, and the aggregation table 660 includes entries S1-S4 up to U entries that represent respective sources.

Although the above description of FIG. 6 describes exemplary aggregation tables, one of ordinary skill in the art would appreciate that any type of aggregation table (which includes event tracking data in one or more dimensions) could be utilized by the multi-tiered analytics system for reporting real-time analytics data. As mentioned above, the multi-tiered analytics system can dynamically create additional aggregation tables according to new queries and/or to report new or different types of visitor activity and web traffic data.

The following description discusses an exemplary process for segmenting event tracking data in discrete units of time according to some configurations. Segmenting the data according to units of time enables the multi-tiered analytics system to report real-time analytics data in a finely granulated manner. In other words, the real-time web site analytics data can be reported in segments corresponding to smaller units of time.

Figure 7:
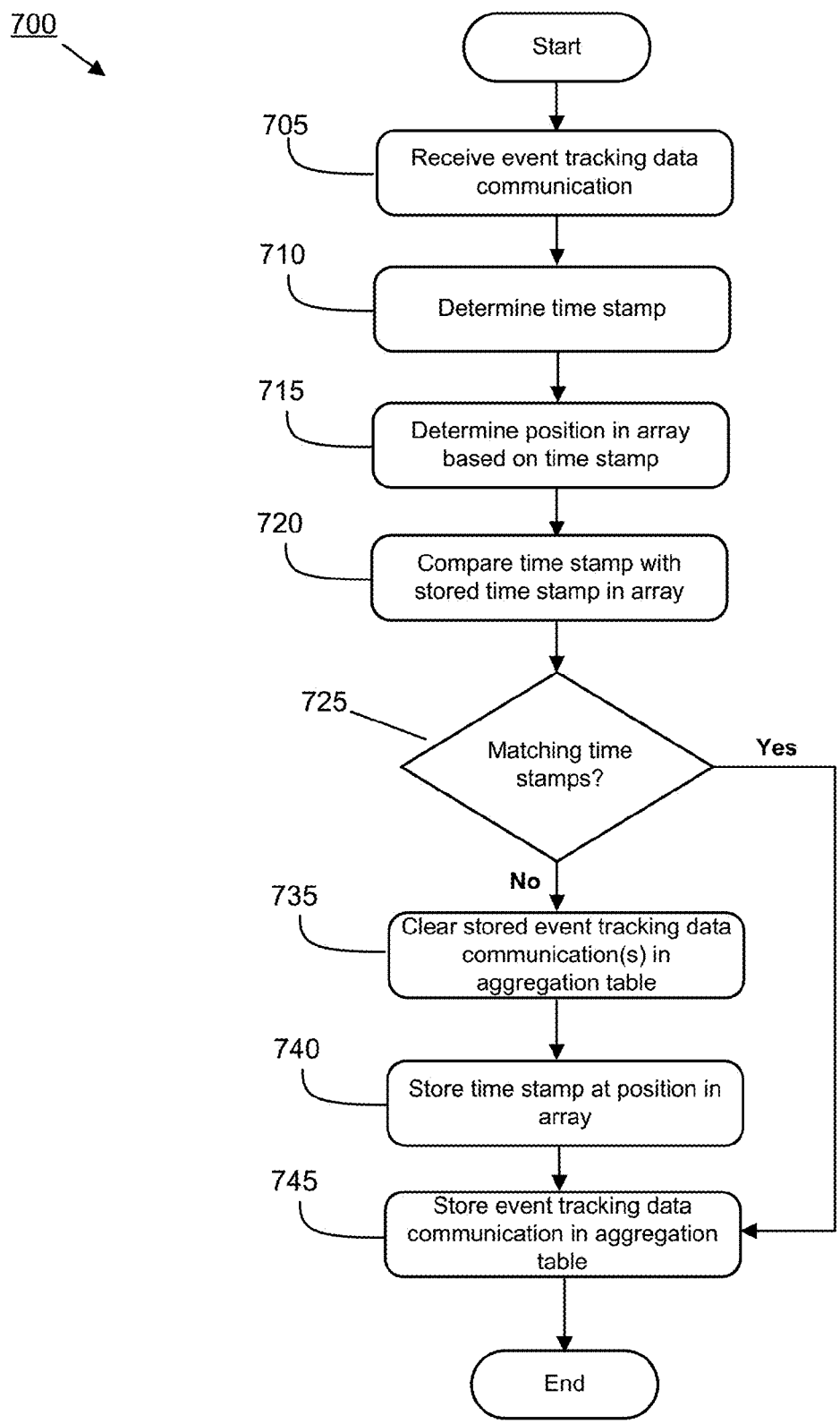
FIG. 7 conceptually illustrates an exemplary process for chronologically segmenting event tracking data of some configurations.

FIG. 7 conceptually illustrates an exemplary process 700 for chronologically segmenting event tracking data of some configurations. More specifically, the process 700 can be implemented by a real-time server to segment incoming event tracking data communications into respective aggregation tables based on a respective period of time.

The process 700 starts when an event tracking data communication is received at 705. By reference to FIG. 1, a real-time server in the real-time analytics tier 140 receives the event tracking data communication from a logging server in the logging tier 120. In some implementations, the real-time server can receive the event tracking data communication when pushed from the logging server as mentioned before. Additionally, one of ordinary skill in the art would realize that the event tracking data communication can be received from other sources and still be within the scope of the subject technology. In some configurations, the real-time server can receive the event tracking data communication from another real-time server.

At 710, the process 700 determines a time stamp for the event tracking data communication. As used herein, the term "time stamp" can be understood as a sequence of characters and/or symbols that indicates the date and/or time at which a particular event or visitor action occurred. In some instances, the process 700 can determine the time stamp as it is included in the event tracking data communication as part of the incoming request.

The process 700 continues to 715 to determine a position in an array based on the time stamp for the received event tracking data communication. In some configurations, the position in the array is determined by performing a modulo n operation on the time stamp, where n represents the size of the array. For instance, in an example where the size of the array is 60, the position in the array can be determined by performing a modulo 60 operation on the time stamp. In this example, it can be understood that the array includes sixty positions in which each position logically represents a respective second within a minute time period. The process 700 of some configurations therefore enables segmentation of the event tracking data according to the size of the array, where each position in the array can be a logical representation of a specific division of time (e.g., second, minute, hour, etc.).

Based on the determined position, the process 700 at 720 compares the time stamp with a stored time stamp at the determined position in the array. For instance, some configurations respectively store associated time stamps for one or more positions in the array for incoming event tracking data communications. Each stored time stamp can reference one or more different aggregation tables that segment the event tracking data according to different respective predetermined queries.

Based on the comparison at 720, the process 700 can decide at 725 whether the time stamps match. In an instance in which the time stamps match one another, the process 700 continues to 745 to store the event tracking data communication based on a particular predetermined query in an aggregation table referenced from the position in the array. Further, as discussed above in reference to FIG. 5, after the event tracking data communication is stored in the aggregation table, the tracking data stored in the aggregation table can be sorted (i.e., ranked according to a specified ordering scheme) according to one or more predetermined criteria (e.g., a number of hits, geographical location, etc.). The process 700 then ends.

Alternatively, in an instance in which the time stamps do not match, the process 700 continues to 735 to clear (i.e., erase or delete) one or more (if any) stored web site traffic data entries in the aggregation table referenced from the position in the array. The process 700 at 740 stores the time stamp at the position in the array. At 745, the process 700 then stores the web site traffic data communication in the aggregation table referenced from the position in the array according to the predetermined query. The process 700 then ends.

In some configurations, the array is referenced from an associative array with one or more entries. One form of an associative array can be a hash table with one or more entries. Each hash table entry can represent a respective web property identity for a particular publisher. The expression "hash table" as used herein can be understood as a data structure including one or more unique keys and corresponding one or more values in which each key is associated with one or more values. In this manner, a hash table of web property identities can be provided to enable segmenting the data according to an associated publishers web property identity (e.g., for a particular web site).

Although a hash table is described above, one of ordinary skill in the art would realize other data structures can be utilized and still be within the scope of the subject technology. By way of example, some configurations can use binary search trees and/or linked lists of key/value pairs for referencing the above described array.

Figure 8:
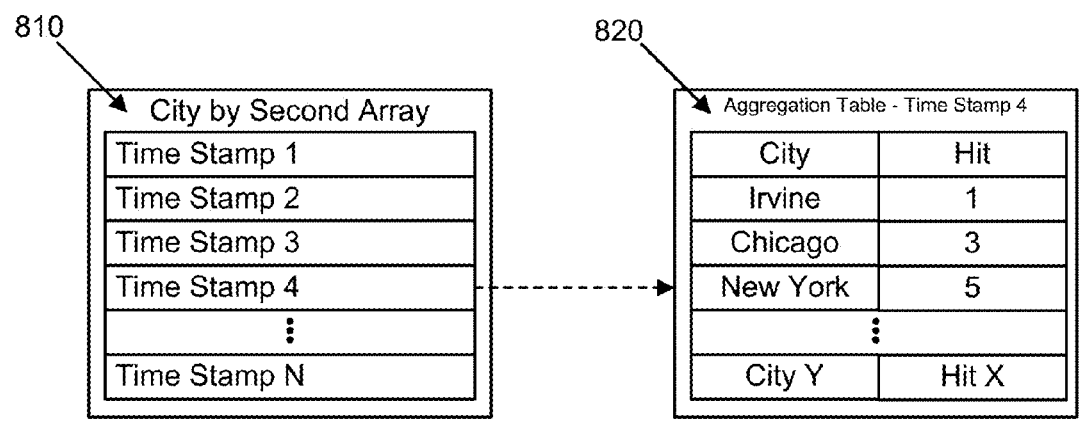
FIG. 8 conceptually illustrates exemplary data structures for segmented event tracking data and an associated aggregation table of some configurations.

The following discussion describes exemplary data structures that could be used by the processes 500 and 700 described above in FIGS. 5 and 7 for segmenting incoming event tracking data communications. FIG. 8 conceptually illustrates exemplary data structures for segmented event tracking data and an associated aggregation table of some configurations. More specifically, FIG. 8 depicts an exemplary array of time stamps and a corresponding aggregation table referenced from one particular time stamp entry in the array. The illustrated data structures of FIG. 8 will be described by reference to corresponding portions of FIG. 6.

As shown in FIG. 8, an array 810 includes 1 to N time stamp entries. The array 810 conceptually represents a city by second array in which each time stamp entry includes a reference to an aggregation table that segments the event tracking data according to a geographical location (i.e., the city) and tracks associated hits for each respective geographical location associated with the event tracking data. Some configurations can include an array with sixty entries in which each entry/position in the array logically represents a different second within a minute.

A particular entry in the array 810 can include a reference to a corresponding aggregation table. For instance, as illustrated in FIG. 8, the entry representing "Time Stamp 4" includes a reference/pointer to an aggregation table 820. Referring to FIG. 6, each entry in the aforementioned array 810 can reference a corresponding aggregation table in the time intervals 610-620. As mentioned above, in the example where the array 810 includes sixty entries (i.e., each entry/position in the array logically represents a different second within a minute), each array entry can reference a corresponding aggregation table in a respective time interval in the timeline 605 corresponding to a respective second within a minute.

As illustrated, the aggregation table 820 includes segmented event tracking data based on the geographical location (i.e., the city) associated with the event tracking data. In this example, the aggregation table 820 includes two columns for 1 to Y entries corresponding to respective geographical locations and an associated number/count of hits. In other words, the aggregation table 820 keeps a count of hits/requests for each geographical location. Referring to FIG. 5, the process 500 can update the aggregation table at 520 to increment the count as shown in the aggregation table 820 in FIG. 8 and then sort the entries in the aggregation table 820 to rank the entries in a specified order (e.g., ascending or descending). As depicted in FIG. 8, the aggregation table 820 ranks the entries in ascending order by the number of hits. Referring to FIG. 6, the aggregation table 820 can be included in a corresponding time interval (i.e., one of the time intervals 610-620) in the timeline 605. For instance, in an example where the aggregation table 820 corresponds with a time X, the aggregation table 820 can be included the time interval 620. All event tracking data included in the aggregation 820 can also be included in the master table 665 in the time interval 620. Additionally, analogous tables to the aggregation table 820 can be included in each of the remaining time intervals in the timeline 605.

The following description discusses an exemplary process for optimizing memory usage for string data associated with event tracking data communications. More specifically, a real-time server repeatedly processes string data which could be stored within an aggregation table. Given the real-time constraints of the real-time analytics system, a real-time server can implement the exemplary process described in further detail below in order to optimize memory usage and improve the performance of the real-time analytics system. In particular, the subject technology provides temporal based data string intern pools ("string intern pool") for reusing data strings and decreasing unnecessary operations to memory. Each string intern pool corresponds with a respective time period (e.g., a respective second within a minute period of time) associated with one or more event tracking data communications (e.g., based on a timestamp in the event tracking data communication).

Figure 9:
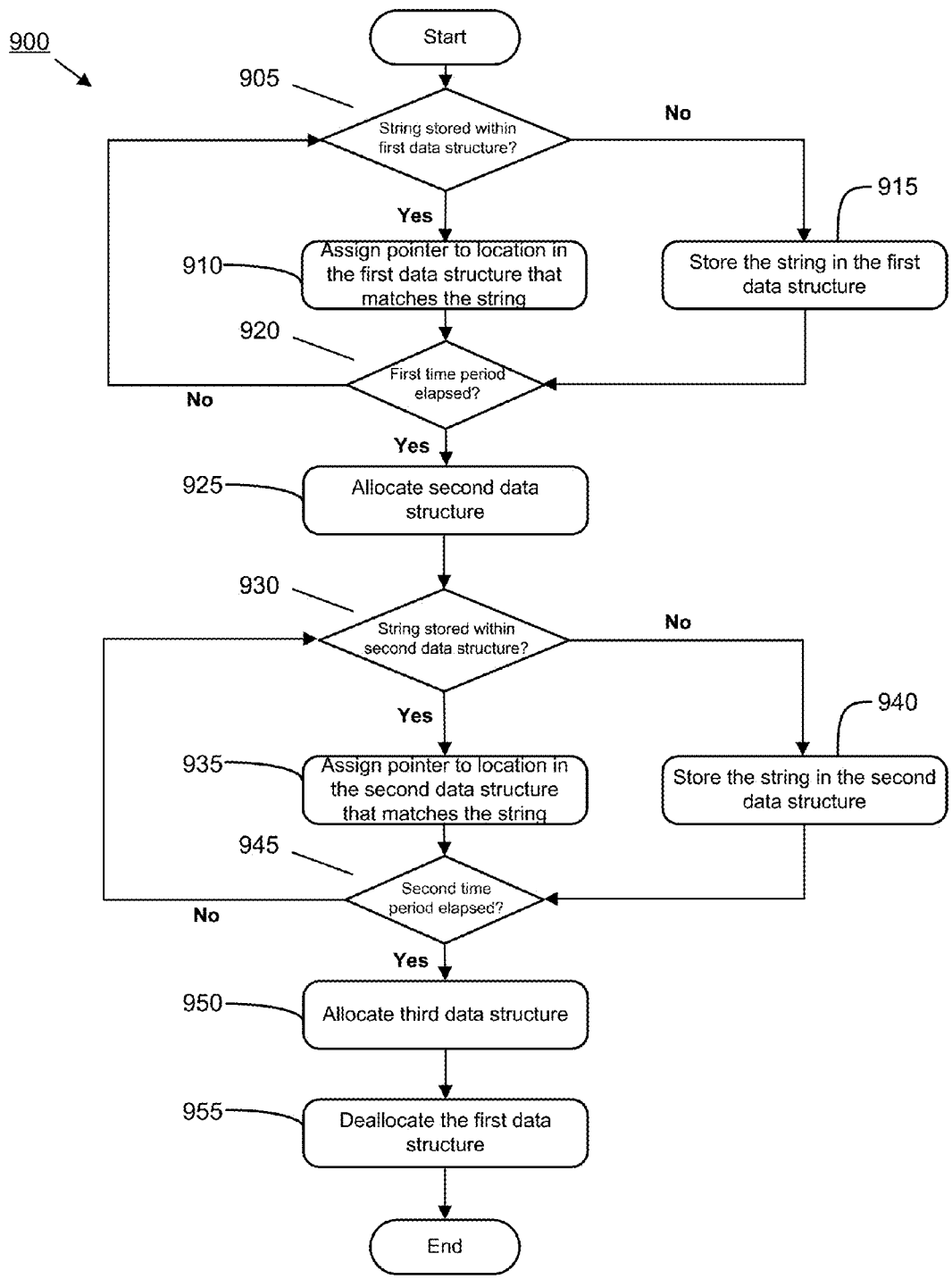
FIG. 9 conceptually illustrates an exemplary process for optimizing memory usage in a real-time analytics system over a rolling window of time.

FIG. 9 conceptually illustrates an exemplary process 900 for optimizing memory usage in a real-time analytics system over a rolling window of time. For a first set of operations, the process 900 starts at 905 by determining, during a first time period, whether a string associated with an event tracking data communication is stored within a first data structure. Different strings could be associated with the event tracking data communication such as geographical location, web page, browser, ad source, time, type of visitor activity, etc. In some configurations, determining whether the string is stored within the first data structure is accomplished by comparing the string to a respective string pointed to by respective pointer in the first data structure.

If the string is stored in the first data structure, the process 900 at 910 assigns a first pointer to a matching string in the first data structure that matches the string associated with the event tracking data communication. More specifically, the process 900 assigns the first pointer to the location in the first data structure to a respective string associated with another event tracking data communication in which the respective string and the first string are matching strings. In this manner, memory usage is conserved because the same string is utilized for event tracking data included in different event tracking data communications (instead of storing additional duplicate strings). Alternatively, the process 900 at 920 stores the string in the first data structure if the string is not stored in the first data structure.

The process 900 at 920 then determines whether the first time period has elapsed. If the first time period has not elapsed, the process 900 can continue back to 905 to repeat the operations for another string associated with another event tracking data communication. Given the continuous data flow of event tracking data through the real-time analytics system, the process 900 can perform the same operations starting at 905 until the first time period has elapsed. If the first time period has elapsed, the process 900 continues to 925.

At 925, during a second time period subsequent to the first time period, the process 900 allocates a second data structure. For instance, the process 900 can allocate the second data structure with an allocation of a memory block of a predetermined size. The process 900 at 930 determines whether a second string associated with a second event tracking data communication is stored within the second data structure. If the string is determined to be stored in the second data structure, the process 900 at 935 assigns a second pointer to a matching string in the second data structure that matches the second string. Alternatively, the process stores the second string in the second data structure if the second string is not stored in the second data structure. In some configurations, the first data structure is maintained for the duration of the second time period for read operations but no additional data is written to the first data structure. Additionally, the second data structure in some instances stores one or more additional unique strings that are not stored in the first data structure.

The process 900 at 945 determines whether the second time period has elapsed. If the second time period has not elapsed, the process 900 can continue back to 930 to repeat the operations for another string associated with another event tracking data communication during the second time period. The process 900 can perform the same operations starting at 930 until the second time period has elapsed. If the second time period has elapsed, the process 900 continues to 950.

At 950, during a third time period subsequent to the second time period, the process 900 allocates a third data structure. The process 900 then at 955 deallocates the first data structure. For instance, the process 900 can deallocate the first data structure by assigning a pointer referencing the first data structure to the third data structure. Deallocating the first data structure occurs in constant time denoted as $\Theta(1)$ in some configurations. The second data structure is maintained during the third period of time in which additional data is not stored in the second data structure during the third period of time.

The first, second and third time periods as described above are equivalent durations of times (e.g., 1 second) in some configurations. Moreover, the first, second and third data structures in some configurations are respective tables (e.g., aggregation tables) for respectively storing strings in the first, second and third time periods.

Figure 10:
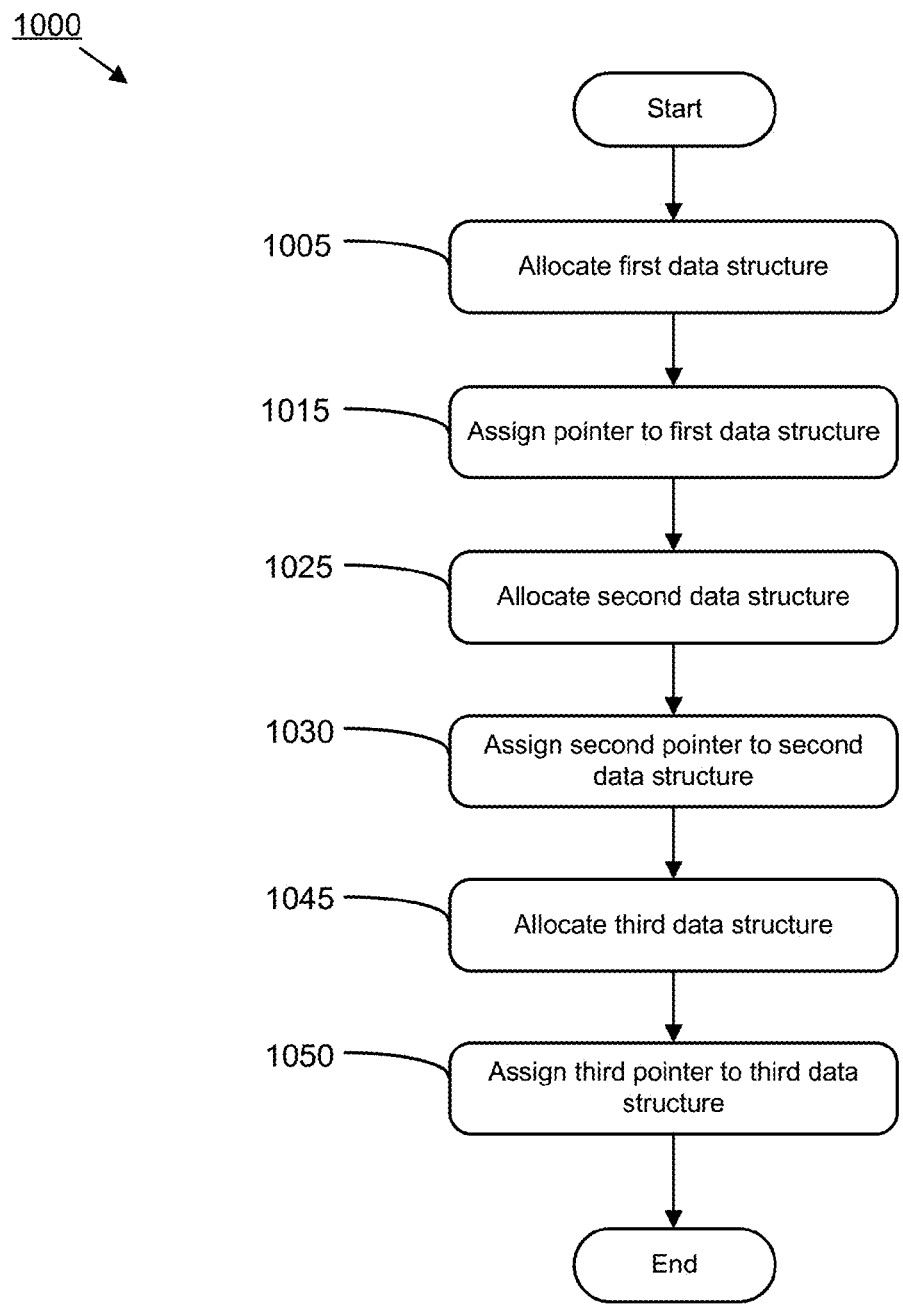
FIG. 10 conceptually illustrates an exemplary process for managing memory allocation in a real-time analytics system over a rolling window of time.

FIG. 10 conceptually illustrates an exemplary process 1000 for managing memory allocation in a real-time analytics system over a rolling window of time. In some configurations, the process 1000 described below can be implemented to run conjunctively with the process 900 described in connection with FIG. 9 above. More specifically, the process 1000 is executed to allocate and deallocate string intern pools in an efficient manner by using different pointers to the string intern pools.

The process 1000 starts at 1005, during a first time period, allocates a first data structure. The process 1000 at 1015 assigns a pointer to the first data structure. In some configurations, the process 1000 can assign a first pointer to a first string in the first data structure. The process 1000 then compares a string associated with an event tracking data communication to the first string referenced by the first pointer. The process 1000 assigns the first pointer to the string if the string and the first string (in the first data structure) are matching strings. Thus, memory is conserved because a duplicate string is not stored in the data structure and the real-time server can access the matching string in the first data structure via an assigned pointer.

During a second time period, the process at 1025 allocates a second data structure. The process 1000 then assigns a second pointer to a second data structure. During a third time period, the process 1000 allocates a third data structure. The process 1000 then assigns the first pointer to a third data structure. In some configurations, assigning the first pointer to the third data structure deallocates the first data structure. By assigning the first pointer to the third data structure, the process 1000 avoids an explicit deallocation of the first data structure because the first pointer is reassigned to point to the third data structure. Thus, the time cost or time complexity for the process 1000 performing pointer reassignment is more efficient.

Figure 11:
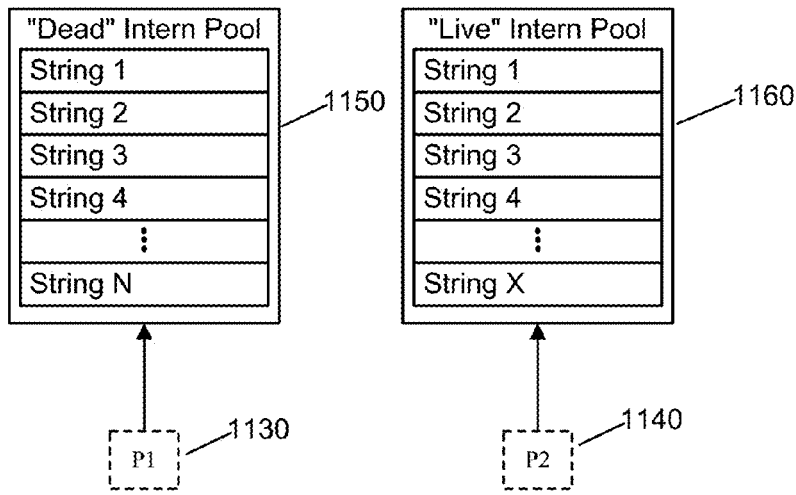
FIG. 11 conceptually illustrates exemplary stages for optimizing memory usage in a real-time analytics system using different string intern pools.
Figure 11:
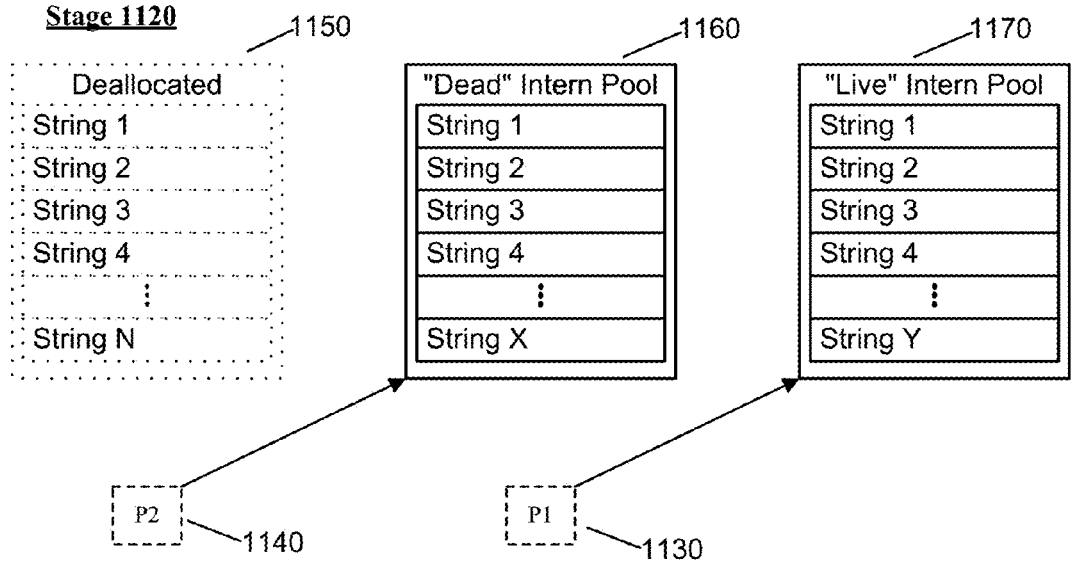

FIG. 11 conceptually illustrates exemplary stages 1110 and 1120 for optimizing memory usage in a real-time analytics system using different string intern pools. FIG. 11 will be discussed with reference to relevant portions of FIG. 10 described above. The string intern pools in one example are respective data structures for storing strings associated with event tracking data.

As shown in a first stage 1110, a first and second string intern pools 1150 and 1160 include one or more strings for two different time periods (e.g., a first time period and a second time period). The first stage 1110 illustrates the second time period that is subsequent to the first time period in which the string intern pool 1160 stores strings for the current period of time that the real-time server is processing. As further shown, a first pointer 1130 points to the first intern pool 1150 and a second pointer 1140 points to the second string intern pool 1160. The first string intern pool 1150 represents a "dead" intern pool in which a data structure stores one or more different strings for read operations by the real-time server. However, write operations are not permitted because the first string intern pool 1150 corresponds with an elapsed time period from the current time period that the real-time server is processing event tracking data. Given that a real-time server may attempt to access data/strings corresponding to the elapsed time period, the first string internal pool is maintained for the duration of the subsequent time period (i.e., the second time period) from the elapsed time period (i.e., the first time period).

Referring back to FIG. 10, the process 1000 at 1005 allocates the first data structure for the first time period, assigns the first pointer at 1015 to the first data structure, allocates the second data structure for the second time period at 1025, and assigns the second pointer to the second data structure. Upon allocation of the second data structure, it should be understood that the first data structure now represents the "dead" string intern pool and the second data structure represents the "live" string intern pool.

As further shown in FIG. 11, a second stage 1120 includes the string intern pool 1150 (illustrated as being deallocated), the string intern pool 1160 and an additional string intern pool 1170. In one example, the second stage 1120 illustrates a third time period subsequent to the second time period shown in the first stage 1110. In the first stage 1110, the pointer 1130 was assigned to the string intern pool 1150 ("dead" intern pool). In the second stage 1120, the pointer 1130 is now assigned to the string intern pool 1170, which represents the "live" intern pool for the third time period. Consequently, the string intern pool 1150 is deallocated by assigning the pointer 1130 to the string intern pool 1170. As further shown in the second stage 1120, the string intern pool 1160 represents the "dead" intern pool which is maintained during the third time period. Referring back to FIG. 10, the process 1000 allocates the third data structure at 1045 and assigns the first pointer to the third data structure at 1050. By assigning the first pointer to the third data structure, the first data structure is deallocated in some configurations.

The following section describes a software architecture of a real-time server that can implement the above described processes and data structures as a computer program running on a particular machine, such as a computer, or stored as instructions in a computer readable medium.

Figure 12:
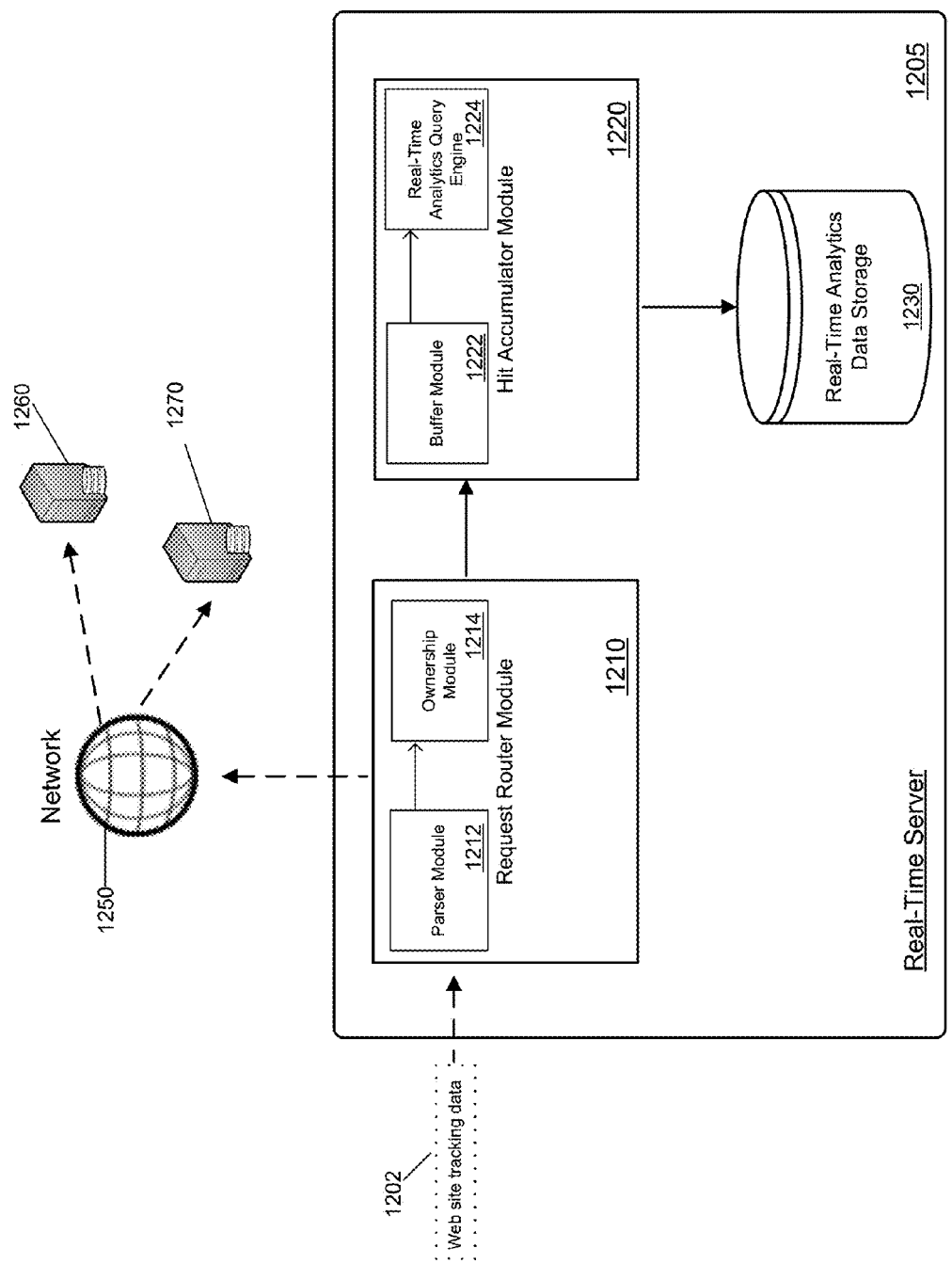
FIG. 12 conceptually illustrates an exemplary software architecture of an real-time server of some configurations.

FIG. 12 conceptually illustrates an exemplary software architecture of a real-time server 1205 of some configurations. In particular, FIG. 12 shows various modules and components of the real-time server 1205 for implementing the above described processes in FIGS. 2, 3, 5, 7, 9 and 10 and the data structures in FIGS. 4, 6, 8 and 11. In some configurations, the software architecture of the real-time server is part of a server-based implementation running a particular machine connected to a network.

As illustrated in FIG. 12, the real-time server 1205 can include a request router module 1210 for parsing and routing event tracking data, a hit accumulator module 1220 for buffering and querying real-time analytics data, and a real-time analytics data storage 1230 for temporarily storing real-time analytics data. The real-time analytics data storage 1230 in some implementations is a type of volatile and non-persistent storage (e.g., RAM). The operation of the aforementioned modules of the real-time server 1205 are discussed in the following description.

The real-time server 1205 can receive event tracking data 1202 in a request router module 1210. The event tracking data 1202 can be in the form of an event tracking data communication that is received over a network 1250. As shown, the request router module 1210 includes a parser module 1212 and an ownership module 1214. The parser module 1212 of some implementations can parse the event tracking data to extract real-time analytics data and to subsequently transmit the real-time analytics data to the ownership module 1214. The ownership module 1214 determines a set of associated real-time servers that are owners of the event tracking data corresponding with a publisher's web site. In an instance where the ownership module 1214 determines that the event tracking data 1202 is not associated with the real-time server 1205, the request router module 1210 can route the event tracking data 1202 over the network 1250 to other associated real-time servers. As shown in FIG. 12, additional real-time servers 1260 and 1270 are connected to the network 1250. Alternatively, in the event that the ownership module 1214 determines that the real-time server 1205 is associated with the event tracking data 1202, the request router module 1210 routes (i.e., sends) the event tracking data to the hit accumulator module 1220 for further processing and temporary storage.

The hit accumulator module 1220 receives the event tracking data routed from the request router module 1210. In some implementations, the hit accumulator module 1220 includes a buffer module 1222 as shown for queuing/aggregating the event tracking data. The buffer module 1222 can be implemented in different ways. For instance, the buffer module 1222 could utilize a first-in first-out (FIFO) scheme in which the earliest received event tracking data is transferred out before later received data. In other instances, the buffer module 1222 could employ a last-in first-out (LIFO) scheme that is analogous to a stack in which the later received data is transferred out before earlier received data.

As shown in FIG. 12, the buffer module 1222 then sends event tracking data to a real-time analytics query engine 1224 in the hit accumulator module 1220. The real-time analytics query engine 1224 of some configurations performs query processing and data management of the real-time analytics data storage 1230. By way of example, the real-time analytics query engine 1224 can perform write and/or update operations to temporarily store the event tracking data to the real-time analytics data storage 1230. Given the requirements of low latency involved with reporting real-time analytics data, the real-time analytics data storage 1230 can be implemented to provide fast access to stored real-time analytics data. In particular, the real-time analytics data storage 1230 can be implemented as fast non-persistent/volatile memory that is periodically flushed and/or overwritten with more recent event tracking data. In this manner, the overhead of managing the data in the real-time analytics data storage 1230 is reduced because longevity of the data is not a primary objective.

In some implementations, the hit accumulator module 1220 can execute queries for sorting and/or aggregating the received event tracking data for temporary storage in the real-time analytics data storage 1230. For instance, referring back to FIG. 1, a real-time server from the real-time analytics tier 140 can aggregate and sort the real-time analytics data according to one or more predetermined queries for temporary storage and then send the aggregated and/or sorted real-time analytics data to the front-end tier 150 for reporting the real-time analytics data. As shown in FIG. 12, the real-time analytics query engine 1224 of hit accumulator module 1220 can execute the queries in order to sort and/or aggregate the received event tracking data before temporarily storing the real-time analytics data in the real-time analytics data storage 1230. The real-time server 1205 can then send the stored aggregated and/or sorted real-time analytics data to a front-end server for reporting and/or presenting real-time analytics data to an end-user.

Moreover, the hit accumulator module 1220 can be configured to segment the received event tracking data into one or more different aggregation tables. For instance, referring back to FIG. 5, the process 500 at 515 segments the event tracking data communication into one or more aggregation tables. As shown in FIG. 12, the real-time analytics query engine 1224 of hit accumulator module 1220 can extract event tracking data from the buffer module 1222 for placement into one or more different aggregation tables in the real-time analytics data storage 1230. Referring to FIG. 6, the one or more aggregation tables can correspond to the different tables in the time intervals 610-620 shown in the timeline 605.

For optimizing the memory usage in the real-time server, the real-time analytics query engine 1224 of some configurations is configured to determine whether a string included in the event tracking data received from buffer module 1222 is stored in a first data structure (e.g., a string intern pool stored by the real-time analytics data storage module 1230), and to assign a first pointer to a matching string in the first data structure that matches the string if the string is stored in the first data structure. As described above in connection with FIGS. 9-11, the first data structure can be a string intern pool implemented as a respective table storing one or more different strings. The real-time analytics data storage module 1230 is configured to store the string included in the event tracking data from the real-time analytics query engine if the string is not stored in the first data structure. In some configurations, the real-time analytics data storage module 1230 stores the string in a respective table representing the string intern pool. For a subsequent time period, the real-time analytics query engine 1224 can allocate another data structure(s) for another string intern pool(s) for storing strings associated with event tracking data communications. The real-time analytics query engine 1224 can then manage the strings in the manner described in FIGS. 9-11 above.

The following section describes an exemplary system that implements aspects of the above described invention.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 13:
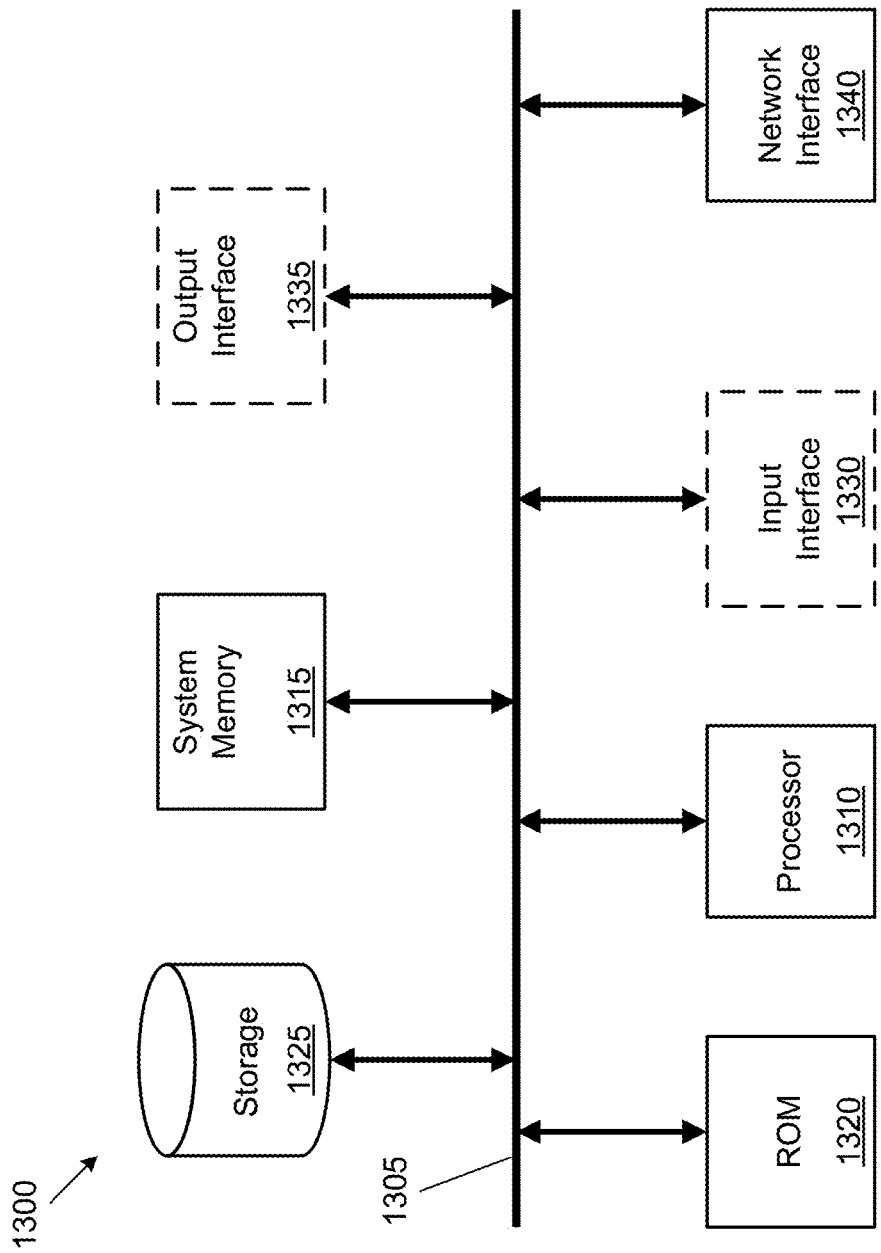
FIG. 13 conceptually illustrates an electronic system in which some configurations are implemented.

FIG. 13 conceptually illustrates a system 1300 with which some implementations of the subject technology may be implemented. The system 1300 can be a computer, phone, PDA, or any other sort of electronic device. Such a system includes various types of computer readable media and interfaces for various other types of computer readable media. The system 1300 includes a bus 1305, processing unit(s) 1310, a system memory 1315, a read-only memory 1320, a storage device 1325, an optional input interface 1330, an optional output interface 1335, and a network interface 1340.

The bus 1305 collectively represents all system, peripheral, and chipset buses that communicatively connect the numerous internal devices of the system 1300. For instance, the bus 1305 communicatively connects the processing unit(s) 1310 with the read-only memory 1320, the system memory 1315, and the storage device 1325.

From these various memory units, the processing unit(s) 1310 retrieves instructions to execute and data to process in order to execute the processes of the invention. The processing unit(s) can be a single processor or a multi-core processor in different implementations.

The read-only-memory (ROM) 1320 stores static data and instructions that are needed by the processing unit(s) 1310 and other modules of the system 1300. The storage device 1325, on the other hand, is a read-and-write memory device. This device is a non-volatile memory unit that stores instructions and data even when the system 1300 is off. Some implementations of the invention use a mass-storage device (such as a magnetic or optical disk and its corresponding disk drive) as the storage device 1325.

Other implementations use a removable storage device (such as a flash drive, a floppy disk, and its corresponding disk drive) as the storage device 1325. Like the storage device 1325, the system memory 1315 is a read-and-write memory device. However, unlike storage device 1325, the system memory 1315 is a volatile read-and-write memory, such a random access memory. The system memory 1315 stores some of the instructions and data that the processor needs at runtime. In some implementations, the invention's processes are stored in the system memory 1315, the storage device 1325, and/or the read-only memory 1320. For example, the various memory units include instructions for processing multimedia items in accordance with some implementations. From these various memory units, the processing unit(s) 1310 retrieves instructions to execute and data to process in order to execute the processes of some implementations.

The bus 1305 also connects to the optional input and output interfaces 1330 and 1335. The optional input interface 1330 enables the user to communicate information and select commands to the system. The optional input interface 1330 can interface with alphanumeric keyboards and pointing devices (also called "cursor control devices"). The optional output interface 1335 can provide display images generated by the system 1300. The optional output interface 1335 can interface with printers and display devices, such as cathode ray tubes (CRT) or liquid crystal displays (LCD). Some implementations can interface with devices such as a touchscreen that functions as both input and output devices.

Finally, as shown in FIG. 13, bus 1305 also couples system 1300 to a network interface 1340 through a network adapter (not shown). In this manner, the computer can be a part of a network of computers (such as a local area network ("LAN"), a wide area network ("WAN"), or an Intranet, or an interconnected network of networks, such as the Internet. Any or all components of system 1300 can be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims

What is claimed is:

1. A machine-implemented method comprising:
allocating memory for a first data structure;
designating the first data structure as a dead intern pool;
allocating memory for a second data structure;
designating the second data structure as a live intern pool;
during a first interval that is part of a rolling window of time,
obtaining a first string extracted from low-latency web traffic data,
determining the live intern pool does not store the first string,
adding the first string to the live intern pool responsive to the determination that the live intern pool does not store the first string,
obtaining a second string from the low-latency web traffic data,
determining the live intern pool stores the second string, and
assigning a pointer identifying a memory location storing the second string responsive to the determination that the live intern pool stores the second string; and
at an end of the first interval that is part of the rolling window of time,
deallocating memory storing the dead intern pool,
designating the live intern pool as the dead intern pool,
allocating memory for a new data structure, and
designating the new data structure as the live intern pool.

2. The method of claim 1, wherein determining the live intern pool does not store the first string further comprises
determining the dead intern pool does not store the first string;
wherein the adding step comprises adding the first string to the live intern pool responsive to the determination that the live intern pool and the dead intern pool do not store the first string; and
during an interval that is part of a rolling window of time, the method further comprising
obtaining a third string from the low-latency web traffic data,
determining the live intern pool does not store the third string,
determining the dead intern pool stores the third string, and
assigning a pointer identifying a memory location storing the third string responsive to the determination that the dead intern pool stores the third string.

3. The method of claim 1, wherein designating the first data structure as a dead intern pool comprises assigning a first data structure pointer identifying a memory location storing the first data structure;
wherein designating the second data structure as a live intern pool comprises assigning a second data structure pointer identifying a memory location storing the second data structure; and
wherein, at an end of the interval that is part of the rolling window of time,
deallocating memory storing the dead intern pool comprises deallocating memory at a memory location identified by the first data structure pointer,
designating the live intern pool as the dead intern pool comprises assigning the first data structure pointer identifying a memory location identified by the second data structure pointer, and
designating the new data structure as the live intern pool comprises assigning the second data structure pointer identifying a memory location storing the new data structure.

4. The method of claim 1, wherein the interval is a predetermined duration, equivalent to the duration of a second interval in the rolling window of time.

5. The method of claim 4, wherein the first interval and the second interval in the rolling window of time are consecutive.

6. The method of claim 1, wherein the rolling window of time has a predetermined duration.

7. The method of claim 1, wherein:
allocating memory for a first data structure comprises allocating memory block of a predetermined size;
allocating memory for a second data structure comprises allocating memory block of the predetermined size; and
allocating memory for a new data structure comprises allocating memory block of the predetermined size.

8. The method of claim 1, wherein the first string is associated with a first event tracking data communication, the first event tracking data communication comprising event tracking data for tracking an activity associated with a source of the first event tracking data communication.

9. The method of claim 8, wherein the event tracking data includes web site traffic data included in a Hypertext Transfer Protocol (HTTP) request associated with a web site.

10. The method of claim 1, wherein the second string is associated with a second event tracking data communication, the second event tracking data communication comprising event tracking data for tracking an activity associated with a source of the second event tracking data communication.

11. A system of maintaining string intern pools, comprising:
a first data structure designated as a dead intern pool;
a second data structure designated as a live intern pool;
a buffer module queuing and transmitting low-latency web tracking data;
an extraction module extracting a first string and a second string from a low-latency web tracking datum;
a time interval manager keeping track of one or more contiguous time intervals;
a data structure manger
determining the live intern pool does not store a first string,
adding the first string to the live intern pool responsive to the determination that the live intern pool does not store the first string,
determining the live intern pool stores the second string,
assigning a pointer identifying a memory location storing the second string responsive to the determination that the live intern pool stores the second string; and
an intern pool manager, at each end of an interval that is part of a rolling window of time,
deallocating a memory storing the dead intern pool, designating the live intern pool as the dead intern pool, allocating memory for a new data structure, and designating the new data structure as the live intern pool.

12. The system of claim 11, wherein the data structure manager further comprises:

determining the dead intern pool does not store the first string; and wherein the data structure manager adding the first string to the live intern pool comprises adding the first string to the live intern pool responsive to the determination that the live intern pool and the dead intern pool do not store the first string.

13. The system of claim 12, wherein the extraction module further comprises extracting a third string from the low-latency web traffic datum; and wherein the data structure manager further comprises determining the live intern pool does not store the third string, determining the dead intern pool stores the third string, assigning a pointer identifying a memory location storing the third string responsive to the determination that the dead intern pool stores the third string.

14. The system of claim 11 further comprising:

a first data structure pointer identifying a memory location storing the first data structure;

a second data structure pointer identifying a memory location storing the second data structure; and wherein the intern pool manager, at each end of an interval that is part of a rolling window of time, comprises deallocating the dead intern pool by deallocating memory at a memory location identified by the first data structure pointer, designating the live intern pool as the dead intern pool by assigning the first data structure pointer identifying a memory location identified by the second data structure pointer, and designating the allocated data structure as the live intern pool by assigning the second data structure pointer identifying a memory location storing the new data structure.

15. The system of claim 11, wherein the time interval manager further comprises measuring intervals of equivalent, predetermined durations.

16. The system of claim 11, wherein the time interval manager further comprises measuring consecutive intervals of time.

17. The system of claim 11, wherein the time interval manager further comprises measuring intervals for a rolling window of time of predetermined duration.

18. The system of claim 11, wherein the intern pool manager further comprises allocating memory for a new data structure of a predetermined size.

19. The system of claim 11, wherein the first string is associated with a first event tracking data communication, the first event tracking data communication comprising event tracking data for tracking an activity associated with a source of the first event tracking data communication.

20. The system of claim 11, wherein the second string is associated with a second event tracking data communication, the second event tracking data communication comprising event tracking data for tracking an activity associated with a source of the second event tracking data communication.

* * * * *